US012645918B2

(12) United States Patent
Kuo

(10) Patent No.: US 12,645,918 B2
(45) Date of Patent: Jun. 2, 2026

(54) TASK SKEW MANAGEMENT FOR NEURAL PROCESSOR CIRCUIT

(71) Applicant: Apple Inc., Cupertino, CA (US)

(72) Inventor: Ponan Kuo, Cupertino, CA (US)

(73) Assignee: APPLE INC., Cupertino, CA (US)

( * ) Notice: Subject to any disclaimer, the term of this patent is extended or adjusted under 35 U.S.C. 154(b) by 911 days.

(21) Appl. No.: 16/942,744

(22) Filed: Jul. 29, 2020

(65) Prior Publication Data

US 2022/0036158 A1     Feb. 3, 2022

(51) Int. Cl.
 *G06N 3/045*          (2023.01)
 *G06N 3/063*          (2023.01)
 *G06N 3/08*           (2023.01)
(52) U.S. Cl.
 CPC ............. *G06N 3/045* (2023.01); *G06N 3/063* (2013.01); *G06N 3/08* (2013.01)
(58) Field of Classification Search
 CPC ........... G06N 3/045; G06N 3/063; G06N 3/08
 USPC .......................................................... 706/16
 See application file for complete search history.

(56) References Cited

U.S. PATENT DOCUMENTS

| | | | | | |
|---|---|---|---|---|---|
| 6,252,848 | B1 * | 6/2001 | Skirmont | ................ | H04L 47/30 |
| | | | | | 714/26 |
| 9,477,533 | B2 | 10/2016 | Eastep et al. | | |
| 10,572,282 | B2 | 2/2020 | Zheng et al. | | |
| 10,884,795 | B2 * | 1/2021 | Liu | ....................... | G06F 9/5083 |

| | | | | | |
|---|---|---|---|---|---|
| 2001/0049671 | A1 * | 12/2001 | Joerg | .................... | G06F 16/951 |
| | | | | | 706/50 |
| 2006/0248535 | A1 * | 11/2006 | Grover | .................. | G06F 9/4887 |
| | | | | | 718/107 |
| 2007/0076936 | A1 * | 4/2007 | Li | .......................... | G16B 30/00 |
| | | | | | 382/129 |
| 2009/0080887 | A1 * | 3/2009 | Levinson | ............ | H04J 14/0282 |
| | | | | | 398/58 |
| 2010/0229181 | A1 * | 9/2010 | Ahuja | ................... | G06F 9/4856 |
| | | | | | 718/107 |

(Continued)

OTHER PUBLICATIONS

Tzeng et al, 2010, "Task Management for Irregular-Parallel Workloads on the GPU" (Year: 2010).*

(Continued)

*Primary Examiner* — Abdullah Al Kawsar
*Assistant Examiner* — Jun Kwon
(74) *Attorney, Agent, or Firm* — Sterne, Kessler, Goldstein & Fox P.L.L.C.

(57)                    ABSTRACT

Embodiments relate to a neural processor circuit including one or more planar engine circuits that perform non-convolution operations in parallel with convolution operations performed by one or more neural engine circuits. The neural engine circuits perform the convolution operations on neural input data corresponding to one or more neural engine tasks to generate neural output data. The planar engine circuits perform non-convolution operations on planar input data corresponding to one or more planar engine tasks to generate planar output data. A data processor circuit that includes multiple buffer circuits performs task skew management between the one or more neural engine tasks and the one or more planar engine tasks. The data processor circuit stops addition of an incoming task to queues in response to one or more of the queues stored in the buffer circuits reaching a threshold.

21 Claims, 15 Drawing Sheets

(56)                    References Cited

U.S. PATENT DOCUMENTS

| | | | |
|---|---|---|---|
| 2011/0317713 A1* | 12/2011 | Assarpour | H04L 12/4625 |
| | | | 370/412 |
| 2015/0261840 A1* | 9/2015 | Clifford | H04L 47/30 |
| | | | 714/26 |
| 2016/0124770 A1* | 5/2016 | Bouchard | G06N 7/01 |
| | | | 718/103 |
| 2018/0314936 A1 | 11/2018 | Barik et al. | |
| 2019/0220742 A1* | 7/2019 | Kuo | G06N 3/08 |
| 2019/0340491 A1* | 11/2019 | Norden | G06N 3/04 |
| 2019/0392194 A1* | 12/2019 | Croxford | G06F 21/6245 |
| 2020/0012521 A1* | 1/2020 | Wu | G06F 9/4856 |
| 2021/0216866 A1* | 7/2021 | Ito | G06N 3/04 |

OTHER PUBLICATIONS

Qiu et al, 2013, "Queueing model analysis and scheduling strategy for embedded multi-core SoC based on task priority" (Year: 2013).*
Shivaratri et al, 1992, "Load Distributing for Locally Distributed systems" (Year: 1992).*
Chen et al, 1996, "On Coupling Multiple Systems With a Global Buffer" (Year: 1996).*
Pesu & Knottenbelt, 2015, "Dynamic Subtask Dispersion Reduction in Heterogeneous Parallel Queueing Systems" (Year: 2015).*
Yousefi'zadeh & Jonckheere, 2005, "Dynamic Neural-Based Buffer Management for Queuing Systems With Self-Similar Characteristics" (Year: 2005).*
Aiken, "A Parallel Neural Network Simulator", 1990 (Year: 1990).*

* cited by examiner

Flow Control Circuit
332

Access Enable Circuit
910

Rasterizer
920

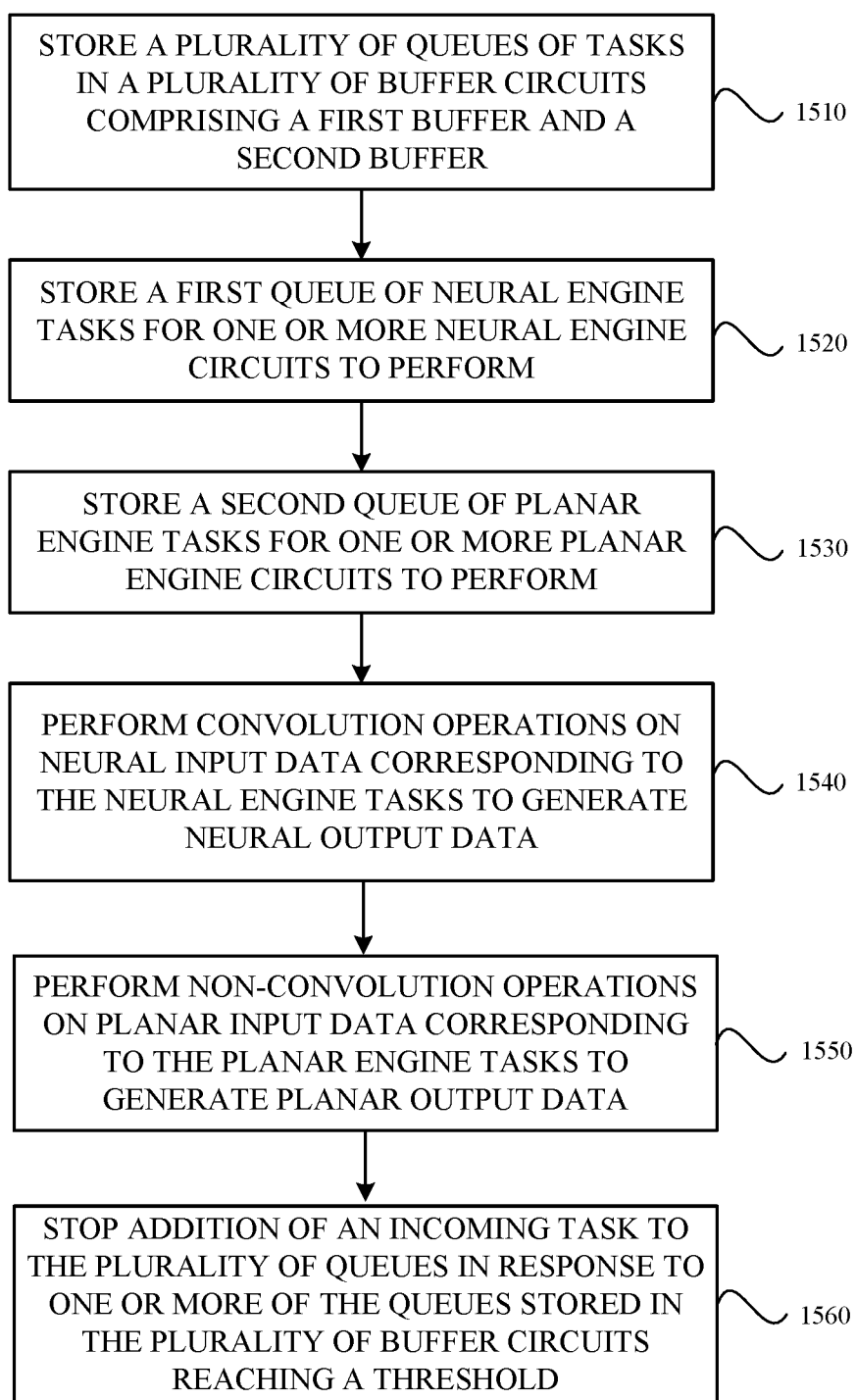

STORE A PLURALITY OF QUEUES OF TASKS IN A PLURALITY OF BUFFER CIRCUITS COMPRISING A FIRST BUFFER AND A SECOND BUFFER          1510

STORE A FIRST QUEUE OF NEURAL ENGINE TASKS FOR ONE OR MORE NEURAL ENGINE CIRCUITS TO PERFORM          1520

STORE A SECOND QUEUE OF PLANAR ENGINE TASKS FOR ONE OR MORE PLANAR ENGINE CIRCUITS TO PERFORM          1530

PERFORM CONVOLUTION OPERATIONS ON NEURAL INPUT DATA CORRESPONDING TO THE NEURAL ENGINE TASKS TO GENERATE NEURAL OUTPUT DATA          1540

PERFORM NON-CONVOLUTION OPERATIONS ON PLANAR INPUT DATA CORRESPONDING TO THE PLANAR ENGINE TASKS TO GENERATE PLANAR OUTPUT DATA          1550

STOP ADDITION OF AN INCOMING TASK TO THE PLURALITY OF QUEUES IN RESPONSE TO ONE OR MORE OF THE QUEUES STORED IN THE PLURALITY OF BUFFER CIRCUITS REACHING A THRESHOLD          1560

*FIG. 15*

TASK SKEW MANAGEMENT FOR NEURAL PROCESSOR CIRCUIT

BACKGROUND

1. Field of the Disclosure

The present disclosure relates to a circuit for performing operations related to neural networks, and more specifically to performing of neural engine tasks and planar engine tasks with a task skew management.

2. Description of the Related Arts

An artificial neural network (ANN) is a computing system or model that uses a collection of connected nodes to process input data. The ANN is typically organized into layers where different layers perform different types of transformation on their input. Extensions or variants of ANN such as convolution neural network (CNN), recurrent neural networks (RNN) and deep belief networks (DBN) have come to receive much attention. These computing systems or models often involve extensive computing operations including multiplication and accumulation. For example, CNN is a class of machine learning technique that primarily uses convolution between input data and kernel data, which can be decomposed into multiplication and accumulation operations.

Depending on the types of input data and operations to be performed, these machine learning systems or models can be configured differently. Such varying configuration would include, for example, pre-processing operations, the number of channels in input data, kernel data to be used, non-linear function to be applied to convolution result, and applying of various post-processing operations. Using a central processing unit (CPU) and its main memory to instantiate and execute machine learning systems or models of various configuration is relatively easy because such systems or models can be instantiated with mere updates to code. However, relying solely on the CPU for various operations of these machine learning systems or models would consume significant bandwidth of a central processing unit (CPU) as well as increase the overall power consumption.

SUMMARY

Embodiments relate to a neural processor circuit including one or more planar engine circuits that perform non-convolution operations in parallel with performing of convolution operations by one or more neural engine circuits. The neural engine circuits perform the convolution operations on neural input data corresponding to one or more neural engine tasks to generate neural output data. The planar engine circuits perform non-convolution operations on planar input data corresponding to one or more planar engine tasks to generate planar output data. A data processor circuit in the neural processor circuit performs task skew management between the one or more neural engine tasks and the one or more planar engine tasks. The data processor circuit includes a plurality of buffer circuits for storing a plurality of queues of tasks. The plurality of buffer circuits includes a first buffer for storing a first queue of the neural engine tasks for the one or more neural engine circuits to perform and a second buffer for storing a second queue of the planar engine tasks for the one or more planar engine circuits to perform. The data processor circuit stops addition of an incoming task to the plurality of queues in response to one or more of the queues stored in the plurality of buffer circuits reaching a threshold.

BRIEF DESCRIPTION OF THE DRAWINGS

FIG. 15 is a flowchart illustrating an example process for performing neural processing operations with task skew management, according to one embodiment.

Figure 1:
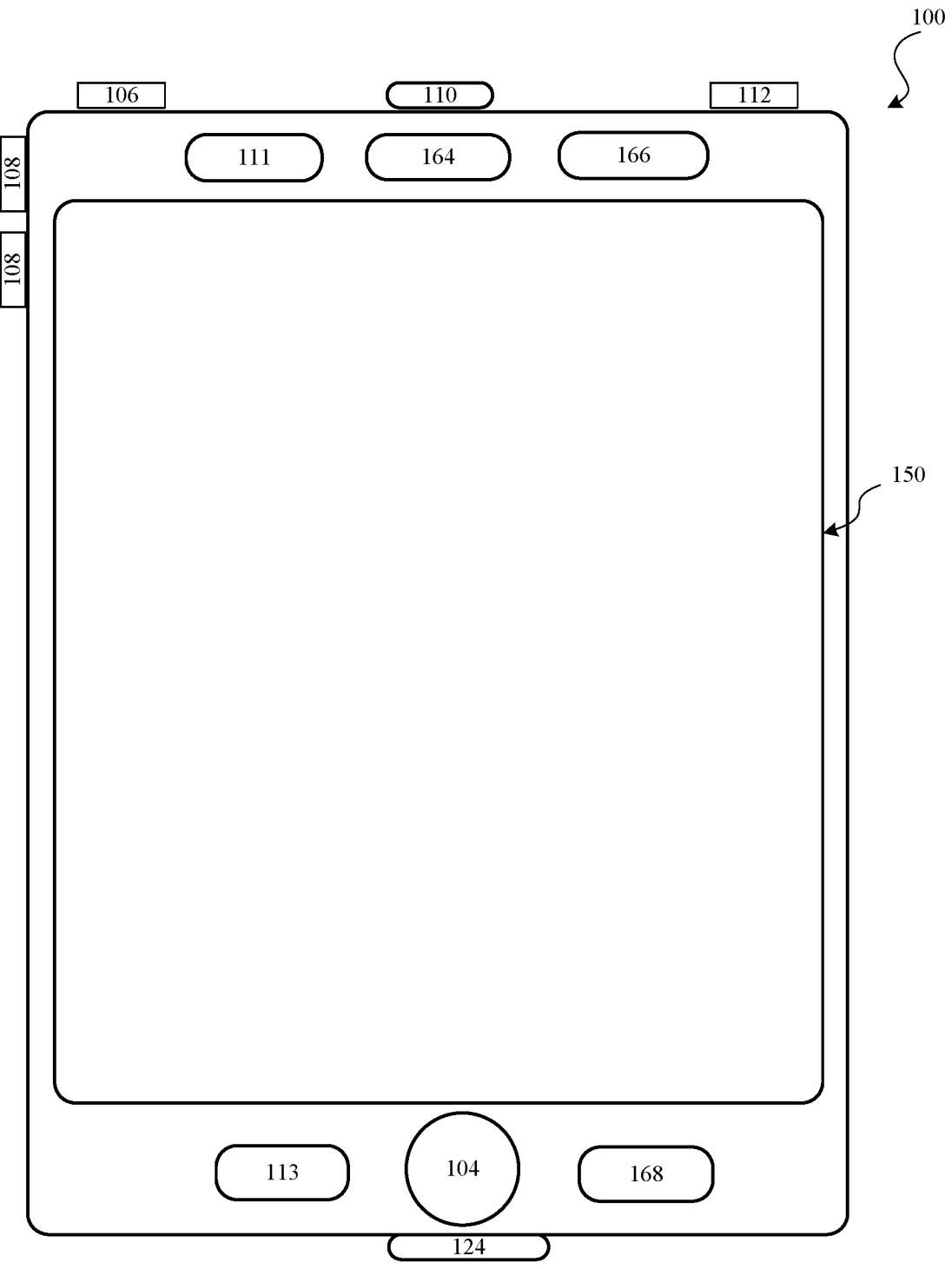
FIG. 1 is a high-level diagram of an electronic device, according to one embodiment

The figures depict, and the detailed description describes, various non-limiting embodiments for purposes of illustration only.

DETAILED DESCRIPTION

Reference will now be made in detail to embodiments, examples of which are illustrated in the accompanying drawings. In the following detailed description, numerous specific details are set forth in order to provide a thorough understanding of the various described embodiments. However, the described embodiments may be practiced without these specific details. In other instances, well-known methods, procedures, components, circuits, and networks have not been described in detail so as not to unnecessarily obscure aspects of the embodiments.

Embodiments of the present disclosure relate to task skew management of a neural processor circuit that includes neural engine circuits and planar engine circuits. The neural engine circuits are efficient at performing convolution operations whereas the planar engine circuits are efficient at performing non-convolution operations. The neural engine circuits and the planar engine circuits may perform operations in parallel, but the time consumed for completing a neural engine task and the time for completing a planar engine task may be different. The difference in timing may create a skew between the neural engine tasks and the planar engine tasks. The neural processor circuit may include two or more buffer circuits, a subset for storing the task queue for neural engine circuits and another subset for storing the task queue for planar engine circuits. The neural processor circuit may stop addition of a task to any of the queues if one of the queues is full to prevent the planar engine circuits from being significantly ahead of the neural engine circuits, or vice versa.

Example Electronic Device

Embodiments of electronic devices, user interfaces for such devices, and associated processes for using such devices are described. In some embodiments, the device is a portable communications device, such as a mobile telephone, that also contains other functions, such as personal digital assistant (PDA) and/or music player functions. Exemplary embodiments of portable multifunction devices include, without limitation, the iPhone®, iPod Touch®, Apple Watch®, and iPad® devices from Apple Inc. of Cupertino, California. Other portable electronic devices, such as wearables, laptops or tablet computers, are optionally used. In some embodiments, the device is not a portable communication device, but is a desktop computer or other computing device that is not designed for portable use. In some embodiments, the disclosed electronic device may include a touch-sensitive surface (e.g., a touch screen display and/or a touchpad). An example electronic device described below in conjunction with Figure (FIG. 1 (e.g., device 100) may include a touch-sensitive surface for receiving user input. The electronic device may also include one or more other physical user-interface devices, such as a physical keyboard, a mouse and/or a joystick.

FIG. 1 is a high-level diagram of an electronic device 100, according to one embodiment. Device 100 may include one or more physical buttons, such as a "home" or menu button 104. Menu button 104 is, for example, used to navigate to any application in a set of applications that are executed on device 100. In some embodiments, menu button 104 includes a fingerprint sensor that identifies a fingerprint on menu button 104. The fingerprint sensor may be used to determine whether a finger on menu button 104 has a fingerprint that matches a fingerprint stored for unlocking device 100. Alternatively, in some embodiments, menu button 104 is implemented as a soft key in a graphical user interface (GUI) displayed on a touch screen.

In some embodiments, device 100 includes touch screen 150, menu button 104, push button 106 for powering the device on/off and locking the device, volume adjustment buttons 108, Subscriber Identity Module (SIM) card slot 110, headset jack 112, and docking/charging external port 124. Push button 106 may be used to turn the power on/off on the device by depressing the button and holding the button in the depressed state for a predefined time interval; to lock the device by depressing the button and releasing the button before the predefined time interval has elapsed; and/or to unlock the device or initiate an unlock process. In an alternative embodiment, device 100 also accepts verbal input for activation or deactivation of some functions through microphone 113. Device 100 includes various components including, but not limited to, a memory (which may include one or more computer readable storage mediums), a memory controller, one or more central processing units (CPUs), a peripherals interface, an RF circuitry, an audio circuitry, speaker 111, microphone 113, input/output (I/O) subsystem, and other input or control devices. Device 100 may include one or more image sensors 164, one or more proximity sensors 166, and one or more accelerometers 168. Device 100 may include more than one type of image sensors 164. Each type may include more than one image sensor 164. For example, one type of image sensors 164 may be cameras and another type of image sensors 164 may be infrared sensors for facial recognition that is performed by one or more machine learning models stored in device 100. Device 100 may include components not shown in FIG. 1 such as an ambient light sensor, a dot projector and a flood illuminator that is to support facial recognition.

Device 100 is only one example of an electronic device, and device 100 may have more or fewer components than listed above, some of which may be combined into a component or have a different configuration or arrangement. The various components of device 100 listed above are embodied in hardware, software, firmware or a combination thereof, including one or more signal processing and/or application-specific integrated circuits (ASICs).

Figure 2:
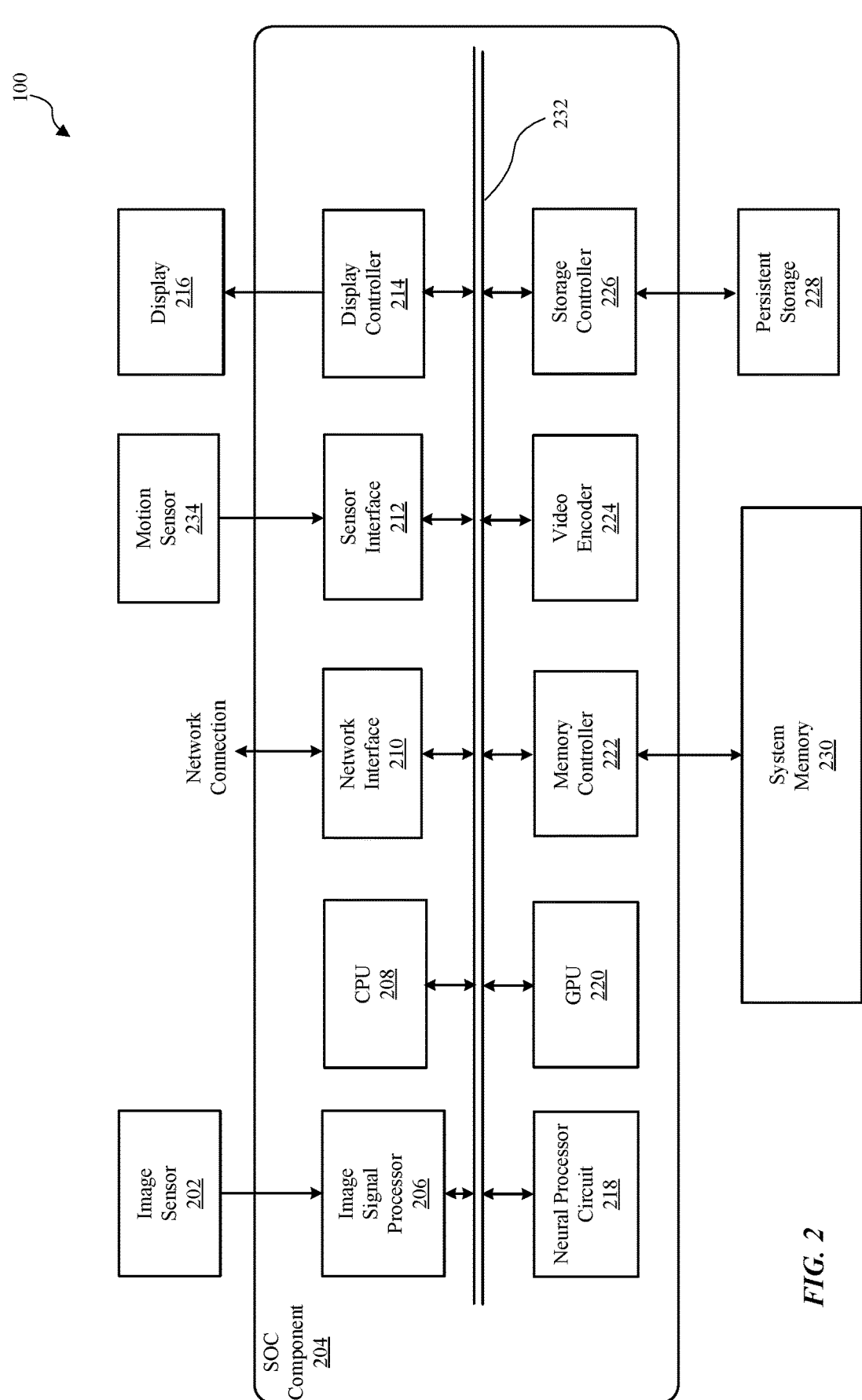
FIG. 2 is a block diagram illustrating components in the electronic device, according to one embodiment.

FIG. 2 is a block diagram illustrating components in device 100, according to one embodiment. Device 100 may perform various operations including implementing one or more machine learning models. For this and other purposes, device 100 may include, among other components, image sensors 202, a system-on-a chip (SOC) component 204, a system memory 230, a persistent storage (e.g., flash memory) 228, a motion sensor 234, and a display 216. The components as illustrated in FIG. 2 are merely illustrative. For example, device 100 may include other components (such as speaker or microphone) that are not illustrated in FIG. 2. Further, some components (such as motion sensor 234) may be omitted from device 100.

An image sensor 202 is a component for capturing image data and may be embodied, for example, as a complementary metal-oxide-semiconductor (CMOS) active-pixel sensor) a camera, video camera, or other devices. Image sensor 202 generates raw image data that is sent to SOC component 204 for further processing. In some embodiments, the image data processed by SOC component 204 is displayed on display 216, stored in system memory 230, persistent storage 228 or sent to a remote computing device via network connection. The raw image data generated by image sensor 202 may be in a Bayer color kernel array (CFA) pattern.

Motion sensor 234 is a component or a set of components for sensing motion of device 100. Motion sensor 234 may generate sensor signals indicative of orientation and/or acceleration of device 100. The sensor signals are sent to SOC component 204 for various operations such as turning on device 100 or rotating images displayed on display 216.

Display 216 is a component for displaying images as generated by SOC component 204. Display 216 may include, for example, liquid crystal display (LCD) device or an organic light-emitting diode (OLED) device. Based on data received from SOC component 204, display 116 may display various images, such as menus, selected operating parameters, images captured by image sensor 202 and processed by SOC component 204, and/or other information received from a user interface of device 100 (not shown).

System memory 230 is a component for storing instructions for execution by SOC component 204 and for storing data processed by SOC component 204. System memory 230 may be embodied as any type of memory including, for example, dynamic random access memory (DRAM), synchronous DRAM (SDRAM), double data rate (DDR, DDR2, DDR3, etc.) RAMBUS DRAM (RDRAM), static RAM (SRAM) or a combination thereof.

Persistent storage 228 is a component for storing data in a non-volatile manner. Persistent storage 228 retains data even when power is not available. Persistent storage 228 may be embodied as read-only memory (ROM), flash memory or other non-volatile random access memory devices. Persistent storage 228 stores an operating system of device 100 and various software applications. Persistent storage 228 may also store one or more machine learning models, such as regression models, random forest models, support vector machines (SVMs) such as kernel SVMs, and artificial neural networks (ANNs) such as convolutional network networks (CNNs), recurrent network networks (RNNs), autoencoders, and long short term memory (LSTM). A machine learning model may be an independent model that works with the neural processor circuit 218 and various software applications or sensors of device 100. A machine learning model may also be part of a software application. The machine learning models may perform various tasks such as facial recognition, image classification, object, concept, and information classification, speech recognition, machine translation, voice recognition, voice command recognition, text recognition, text and context analysis, other natural language processing, predictions, and recommendations.

Various machine learning models stored in device 100 may be fully trained, untrained, or partially trained to allow device 100 to reinforce or continue to train the machine learning models as device 100 is used. Operations of the machine learning models include various computation used in training the models and determining results in runtime using the models. For example, in one case, device 100 captures facial images of the user and uses the images to continue to improve a machine learning model that is used to lock or unlock the device 100.

SOC component 204 is embodied as one or more integrated circuit (IC) chip and performs various data processing processes. SOC component 204 may include, among other subcomponents, image signal processor (ISP) 206, a central processor unit (CPU) 208, a network interface 210, sensor interface 212, display controller 214, neural processor circuit 218, graphics processor (GPU) 220, memory controller 222, video encoder 224, storage controller 226, and bus 232 connecting these subcomponents. SOC component 204 may include more or fewer subcomponents than those shown in FIG. 2.

ISP 206 is a circuit that performs various stages of an image processing pipeline. In some embodiments, ISP 206 may receive raw image data from image sensor 202, and process the raw image data into a form that is usable by other subcomponents of SOC component 204 or components of device 100. ISP 206 may perform various image-manipulation operations such as image translation operations, horizontal and vertical scaling, color space conversion and/or image stabilization transformations.

CPU 208 may be embodied using any suitable instruction set architecture, and may be configured to execute instructions defined in that instruction set architecture. CPU 208 may be general-purpose or embedded processors using any of a variety of instruction set architectures (ISAs), such as the x86, PowerPC, SPARC, RISC, ARM or MIPS ISAs, or any other suitable ISA. Although a single CPU is illustrated in FIG. 2, SOC component 204 may include multiple CPUs. In multiprocessor systems, each of the CPUs may commonly, but not necessarily, implement the same ISA.

Graphics processing unit (GPU) 220 is graphics processing circuitry for performing graphical data. For example, GPU 220 may render objects to be displayed into a frame buffer (e.g., one that includes pixel data for an entire frame). GPU 220 may include one or more graphics processors that may execute graphics software to perform a part or all of the graphics operation, or hardware acceleration of certain graphics operations.

Neural processor circuit 218 is a circuit that performs various machine learning operations based on computation including multiplication, addition, and accumulation. Such computation may be arranged to perform, for example, various types of tensor multiplications such as tensor product and convolution of input data and kernel data. Neural processor circuit 218 is a configurable circuit that performs these operations in a fast and power-efficient manner while relieving CPU 208 of resource-intensive operations associated with neural network operations. Neural processor circuit 218 may receive the input data from sensor interface 212, the image signal processor 206, persistent storage 228, system memory 230 or other sources such as network interface 210 or GPU 220. The output of neural processor circuit 218 may be provided to various components of device 100 such as image signal processor 206, system memory 230 or CPU 208 for various operations. The structure and operation of neural processor circuit 218 are described below in detail with reference to FIG. 3.

Network interface 210 is a subcomponent that enables data to be exchanged between devices 100 and other devices via one or more networks (e.g., carrier or agent devices). For example, video or other image data may be received from other devices via network interface 210 and be stored in system memory 230 for subsequent processing (e.g., via a back-end interface to image signal processor 206) and display. The networks may include, but are not limited to, Local Area Networks (LANs) (e.g., an Ethernet or corporate network) and Wide Area Networks (WANs). The image data received via network interface 210 may undergo image processing processes by ISP 206.

Sensor interface 212 is circuitry for interfacing with motion sensor 234. Sensor interface 212 receives sensor information from motion sensor 234 and processes the sensor information to determine the orientation or movement of device 100.

Display controller 214 is circuitry for sending image data to be displayed on display 216. Display controller 214 receives the image data from ISP 206, CPU 208, graphic processor or system memory 230 and processes the image data into a format suitable for display on display 216.

Memory controller 222 is circuitry for communicating with system memory 230. Memory controller 222 may read data from system memory 230 for processing by ISP 206, CPU 208, GPU 220 or other subcomponents of SOC component 204. Memory controller 222 may also write data to system memory 230 received from various subcomponents of SOC component 204.

Video encoder 224 is hardware, software, firmware or a combination thereof for encoding video data into a format suitable for storing in persistent storage 128 or for passing the data to network interface 210 for transmission over a network to another device.

In some embodiments, one or more subcomponents of SOC component 204 or some functionality of these subcomponents may be performed by software components executed on neural processor circuit 218, ISP 206, CPU 208 or GPU 220. Such software components may be stored in system memory 230, persistent storage 228 or another device communicating with device 100 via network interface 210.

Example Neural Processor Circuit

Neural processor circuit 218 is a programmable circuit that performs machine learning operations on the input data of neural processor circuit 218. Machine learning operations may include different computations for training of a machine learning model and for performing inference or prediction based on the trained machine learning model.

Taking an example of a CNN as the machine learning model, training of the CNN may include forward propagation and backpropagation. A neural network may include an input layer, an output layer, and one or more intermediate layers that may be referred to as hidden layers. Each layer may include one or more nodes, which may be fully or partially connected to other nodes in adjacent layers. In forward propagation, the neural network performs computation in the forward direction based on outputs of a preceding layer. The operation of a node may be defined by one or more functions. The functions that define the operation of a node may include various computation operation such as convolution of data with one or more kernels, pooling of layers, tensor multiplication, etc. The functions may also include an activation function that adjusts the weight of the output of the node. Nodes in different layers may be associated with different functions. For example, a CNN may include one or more convolutional layers that are mixed with pooling layers and are followed by one or more fully connected layers.

Each of the functions, including kernels, in a machine learning model may be associated with different coefficients that are adjustable during training. In addition, some of the nodes in a neural network each may also be associated with an activation function that decides the weight of the output of the node in a forward propagation. Common activation functions may include step functions, linear functions, sigmoid functions, hyperbolic tangent functions (tanh), and rectified linear unit functions (ReLU). After a batch of data of training samples passes through a neural network in the forward propagation, the results may be compared to the training labels of the training samples to compute the network's loss function, which represents the performance of the network. In turn, the neural network performs backpropagation by using coordinate descent such as stochastic coordinate descent (SGD) to adjust the coefficients in various functions to improve the value of the loss function.

In training, device 100 may use neural processor circuit 218 to perform all or some of the operations in the forward propagation and backpropagation. Multiple rounds of forward propagation and backpropagation may be performed by neural processor circuit 218, solely or in coordination with other processors such as CPU 208, GPU 220, and ISP 206. Training may be completed when the loss function no longer improves (e.g., the machine learning model has converged) or after a predetermined number of rounds for a particular set of training samples. As device 100 is used, device 100 may continue to collect additional training samples for the neural network.

For prediction or inference, device 100 may receive one or more input samples. Neural processor circuit 218 may take the input samples to perform forward propagation to determine one or more results. The input samples may be images, speeches, text files, sensor data, or other data.

Data and functions (e.g., input data, kernels, functions, layers outputs, gradient data) in machine learning may be saved and represented by one or more tensors. Common operations related to training and runtime of a machine learning model may include tensor product, tensor transpose, tensor elementwise operation, convolution, application of an activation function, automatic differentiation to determine gradient, statistics and aggregation of values in tensors (e.g., average, variance, standard deviation), tensor rank and size manipulation, etc.

While the training and runtime of a neural network is discussed as an example, the neural processor circuit 218 may also be used for the operations of other types of machine learning models, such as a kernel SVM.

Figure 3:
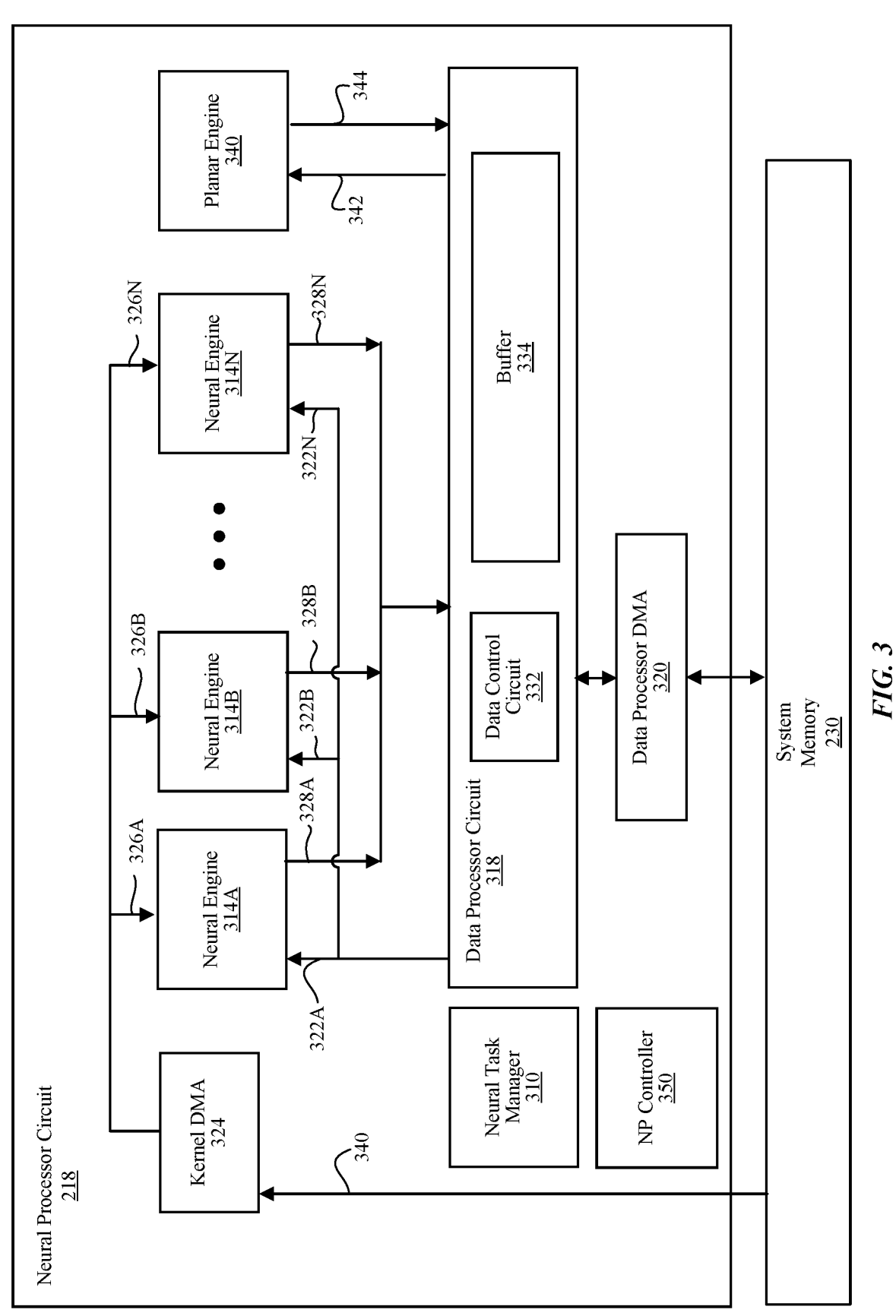
FIG. 3 is a block diagram illustrating a neural processor circuit, according to one embodiment.

Referring to FIG. 3, an example neural processor circuit 218 may include, among other components, neural task manager 310, a plurality of neural engines 314A through 314N (hereinafter collectively referred as "neural engines 314" and individually also referred to as "neural engine 314"), kernel direct memory access (DMA) 324, data processor circuit 318, data processor DMA 320, planar engine 340, and neural processor (NP) controller 350. Neural processor circuit 218 may include fewer components than what are illustrated in FIG. 3 or include additional components not illustrated in FIG. 3.

Each of neural engines 314 performs computing operations for machine learning in parallel. Depending on the load of operation, the entire set of neural engines 314 may be operating or only a subset of the neural engines 314 may be operating while the remaining neural engines 314 are placed in a power-saving mode to conserve power. Each of neural engines 314 includes components for storing one or more kernels, for performing multiply-accumulate operations, and for post-processing to generate an output data 328, as described below in detail with reference to FIG. 4. Neural engines 314 may specialize in performing computation heavy operations such as convolution operations and tensor product operations. Convolution operations may include different kinds of convolutions, such as cross-channel convolutions (a convolution that accumulates values from different channels), channel-wise convolutions, and transposed convolutions.

Planar engine 340 may specialize in performing simpler computing operations whose speed may primarily depend on the input and output (I/O) speed of the data transmission instead of the computation speed within planar engine 340. These computing operations may be referred to as I/O bound computations and are also referred to as "non-convolution operations" herein. In contrast, neural engines 314 may focus on complex computation such as convolution operations whose speed may primarily depend on the computation speed within each neural engine 314. For example, planar engine 340 is efficient at performing operations within a single channel while neural engines 314 are efficient at performing operations across multiple channels that may involve heavy accumulation of data. The use of neural engine 314 to compute I/O bound computations may not be efficient in terms of both speed and power consumption. In one embodiment, input data may be a tensor whose rank is larger than three (e.g., having three or more dimensions). A set of dimensions (two or more) in the tensor may be referred to as a plane while another dimension may be referred to as a channel. Neural engines 314 may convolve data of a plane in the tensor with a kernel and accumulate results of the convolution of different planes across different channels. On the other hand, planar engine 340 may specialize in operations within the plane.

The circuitry of planar engine 340 may be programmed for operation in one of multiple modes, including a pooling mode, an elementwise mode, and a reduction mode. In the pooling mode, planar engine 340 reduce a spatial size of input data. In the elementwise mode, planar engine 340 generates an output that is derived from elementwise operations of one or more inputs. In the reduction mode, planar engine 340 reduces the rank of a tensor. For example, a rank 5 tensor may be reduced to a rank 2 tensor, or a rank 3 tensor may be reduced to a rank 0 tensor (e.g., a scalar). The operations of planar engine 340 will be discussed in further detail below with reference to FIG. 5.

Neural task manager 310 manages the overall operation of neural processor circuit 218. Neural task manager 310 may receive a task list from a compiler executed by CPU 208, store tasks in its task queues, choose a task to perform, and send task commands to other components of the neural processor circuit 218 for performing the chosen task. Data may be associated with a task command that indicates the types of operations to be performed on the data. Data of the neural processor circuit 218 includes input data that is transmitted from another source such as system memory 230, and data generated by the neural processor circuit 218 in a previous operation cycle. Each dataset may be associated with a task command that specifies the type of operations to be performed on the data. Neural task manager 310 may also perform switching of tasks on detection of events such as receiving instructions from CPU 208. In one or more embodiments, neural task manager 310 sends rasterizer information to the components of neural processor circuit 218 to enable each of the components to track, retrieve or process appropriate segments of the input data and kernel data. For example, neural task manager 310 may include registers that stores the information regarding the size and rank of a dataset for processing by the neural processor circuit 218. Although neural task manager 310 is illustrated in FIG. 3 as part of neural processor circuit 218, neural task manager 310 may be a component outside the neural processor circuit 218.

Kernel DMA 324 is a read circuit that fetches kernel data from a source (e.g., system memory 230) and sends kernel data 326A through 326N to each of the neural engines 314. Kernel data represents information from which kernel elements can be extracted. In one embodiment, the kernel data may be in a compressed format which is decompressed at each of neural engines 314. Although kernel data provided to each of neural engines 314 may be the same in some instances, the kernel data provided to each of neural engines 314 is different in most instances. In one embodiment, the direct memory access nature of kernel DMA 324 may allow kernel DMA 324 to fetch and write data directly from the source without the involvement of CPU 208.

Data processor circuit 318 manages data traffic and task performance of neural processor circuit 218. Data processor circuit 318 may include a data control circuit 332 and a buffer 334. Buffer 334 is temporary storage for storing data associated with operations of neural processor circuit 218, such as input data that is transmitted from system memory 230 (e.g., data from a machine learning model) and other data that is generated within neural processor circuit 218. The input data may be transmitted from system memory 230. The data stored in data processor circuit 318 may include different subsets that are sent to various downstream components, such as neural engines 314 and planar engine 340.

In one embodiment, buffer 334 is embodied as a non-transitory memory that can be accessed by neural engines 314 and planar engine 340. Buffer 334 may store input data 322A through 322N (also referred to as "neural input data" herein) for feeding to corresponding neural engines 314A through 314N and input data 342 (also referred to as "planar input data" herein) for feeding to planar engine 340, as well as output data 328A through 328N from each of neural engines 314A through 314N (also referred to as "neural output data" herein) and output data 344 from planar engine

340 (also referred to as "planar output data" herein) for feeding back into one or more neural engines 314 or planar engine 340, or sending to a target circuit (e.g., system memory 230). Buffer 334 may also store input data 342 and output data 344 of planar engine 340 and allow the exchange of data between neural engine 314 and planar engine 340. For example, one or more output data 328A through 328N of neural engines 314 are used as planar input data 342 to planar engine 340. Likewise, planar output data 344 of planar engine 340 may be used as the input data 322A through 322N of neural engines 314. The inputs of neural engines 314 or planar engine 340 may be any data stored in buffer 334. For example, in various operating cycles, the source datasets from which one of the engines fetches as inputs may be different. The input of an engine may be an output of the same engine in previous cycles, outputs of different engines, or any other suitable source datasets stored in buffer 334. Also, a dataset in buffer 334 may be divided and sent to different engines for different operations in the next operating cycle. Two datasets in buffer 334 may also be joined for the next operation.

Data control circuit 332 of data processor circuit 318 may control the exchange of data between neural engines 314 and planar engine 340. The operations of data processor circuit 318 and other components of neural processor circuit 218 are coordinated so that the input data and intermediate data stored in data processor circuit 318 may be reused across multiple operations at neural engines 314 and planar engine 340, thereby reducing data transfer to and from system memory 230. Data control circuit 332 may perform one or more of the following operations: (i) monitor the size and rank of data (e.g. data may be one or more tensors) that are being processed by neural engines 314 and planar engine 340, (ii) determine which subsets of data are transmitted to neural engines 314 or to planar engine 340 based on the task commands associated with different subsets of data, (iii) determine the manner in which data is transmitted to neural engines 314 and planar engine 340 (e.g., the data processor circuit 318 may operate in a broadcast mode where the same data is fed to multiple input channels of neural engines 314 so that multiple or all neural engines 314 receive the same data or in a unicast mode where different neural engines 314 receives different data), and (iv) transmit a configuration command to the planar engine 340 to direct planar engine 340 to program itself for operating in one of multiple operation modes. Details of data control circuit 332 are described below in detail with reference to FIG. 9.

The data of neural processor circuit 218 stored in buffer 334 may be part of, among others, image data, histogram of oriented gradients (HOG) data, audio data, metadata, output data 328 of a previous cycle of a neural engine 314, and other processed data received from other components of the SOC component 204.

Data processor DMA 320 includes a read circuit that receives a segment of the input data from a source (e.g., system memory 230) for storing in buffer 334, and a write circuit that forwards data from buffer 334 to a target component (e.g., system memory). In one embodiment, the direct memory access nature of data processor DMA 320 may allow data processor DMA 320 to fetch and write data directly from a source (e.g., system memory 230) without the involvement of CPU 208. Buffer 334 may be a direct memory access buffer that stores data of a machine learning model of device 100 without involvement of CPU 208.

Neural Processor (NP) controller 350 is a control circuit that performs various operations to control the overall operation of neural processor circuit 218. NP controller 350 may interface with CPU 208, program components of neural processor circuit 218 by setting register in the components and perform housekeeping operations. NP controller 350 may also initialize components in neural processor circuit 218 when neural processor circuit 218 is turned on.

Example Neural Engine Architecture

Figure 4:
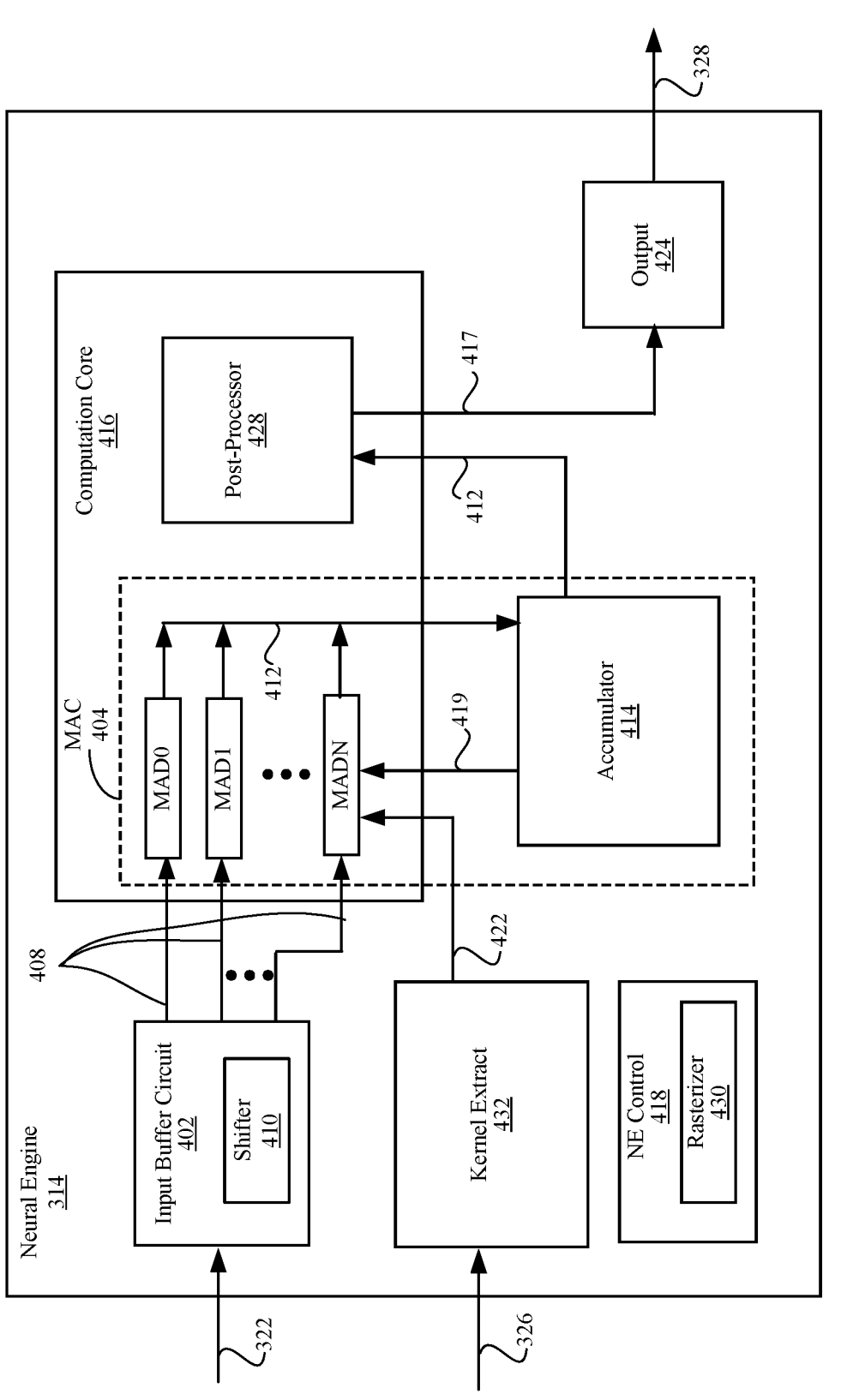
FIG. 4 is a block diagram of a neural engine in the neural processor circuit, according to one embodiment.

FIG. 4 is a block diagram of neural engine 314, according to one embodiment. Neural engine 314 is a circuit that performs various operations to facilitate machine learning such as convolution, tensor product, and other operations may involve heavy computation. For this purpose, neural engine 314 receives input data 322, performs multiply-accumulate operations (e.g., convolution operations) on input data 322 based on stored kernel data, performs further post-processing operations on the result of the multiply-accumulate operations, and generates output data 328. Input data 322 and/or output data 328 of neural engine 314 may be of a single channel or span across multiple channels.

Neural engine 314 may include, among other components, input buffer circuit 402, computation core 416, neural engine (NE) control 418, kernel extract circuit 432, accumulator 414 and output circuit 424. Neural engine 314 may include fewer components than what is illustrated in FIG. 4 or include further components not illustrated in FIG. 4.

Input buffer circuit 402 is a circuit that stores a subset of the data of neural processor circuit 218 as the subset of data is received from a source. The source may be data processor circuit 318, planar engine 340, or another suitable component. Input buffer circuit 402 sends an appropriate segment 408 of data for a current task or process loop to computation core 416 for processing. Input buffer circuit 402 may include a shifter 410 that shifts read locations of input buffer circuit 402 to change segment 408 of data sent to computation core 416. By changing segments of input data provided to computation core 416 via shifting, neural engine 314 can perform multiply-accumulate for different segments of input data based on a fewer number of read operations. In one or more embodiments, the data of neural processor circuit 218 includes data of difference convolution groups and/or input channels.

Kernel extract circuit 432 is a circuit that receives kernel data 326 from kernel DMA 324 and extracts kernel coefficients 422. In one embodiment, kernel extract circuit 432 references a lookup table (LUT) and uses a mask to reconstruct a kernel from compressed kernel data 326 based on the LUT. The mask indicates locations in the reconstructed kernel to be padded with zero and remaining locations to be filled with numbers. Kernel coefficients 422 of the reconstructed kernel are sent to computation core 416 to populate register in multiply-add (MAD) circuits of computation core 416. In other embodiments, kernel extract circuit 432 receives kernel data in an uncompressed format and the kernel coefficients are determined without referencing a LUT or using a mask.

Computation core 416 is a programmable circuit that performs computation operations. For this purpose, computation core 416 may include MAD circuits MAD0 through MADN and a post-processor 428. Each of MAD circuits MAD0 through MADN may store an input value in the segment 408 of the input data and a corresponding kernel coefficient in kernel coefficients 422. The input value and the corresponding kernel coefficient are multiplied in each of MAD circuits to generate a processed value 412.

Accumulator 414 is a memory circuit that receives and stores processed values 412 from MAD circuits. The processed values stored in accumulator 414 may be sent back as feedback information 419 for further multiply and add operations at MAD circuits or sent to post-processor 428 for post-processing. Accumulator 414 in combination with MAD circuits form a multiply-accumulator (MAC) 404. In one or more embodiments, accumulator 414 may have subunits where each subunit sends data to different components of neural engine 314. For example, during a processing cycle, data stored in a first subunit of accumulator 414 is sent to the MAC circuit while data stored in a second subunit of accumulator 414 is sent to post-processor 428.

Post-processor 428 is a circuit that performs further processing of values 412 received from accumulator 414. Post-processor 428 may perform operations including, but not limited to, applying linear functions (e.g., Rectified Linear Unit (ReLU)), normalized cross-correlation (NCC), merging the results of performing neural operations on 8-bit data into 16-bit data, and local response normalization (LRN). The result of such operations is output from post-processor 428 as processed values 417 to output circuit 424. In some embodiments, the processing at the post-processor 428 is bypassed. For example, the data in accumulator 414 may be sent directly to output circuit 424 for access by other components of neural processor circuit 218.

NE control 418 controls operations of other components of neural engine 314 based on the operation modes and parameters of neural processor circuit 218. Depending on different modes of operation (e.g., group convolution mode or non-group convolution mode) or parameters (e.g., the number of input channels and the number of output channels), neural engine 314 may operate on different input data in different sequences, return different values from accumulator 414 to MAD circuits, and perform different types of post-processing operations at post-processor 428. To configure components of neural engine 314 to operate in a desired manner, the NE control 418 sends task commands that may be included in information 419 to components of neural engine 314. NE control 418 may include a rasterizer 430 that tracks the current task or process loop being processed at neural engine 314.

Input data is typically split into smaller pieces of data for parallel processing at multiple neural engines 314 or neural engines 314 and planar engine 340. A set of data used for a convolution operation may be referred to as a convolution group, which can be split into multiple smaller units. The hierarchy of smaller units (segments) may be convolution groups, slices, tiles, work units, output channel groups, input channels (Cin), sub-Cins for input stride, etc. For example, a convolution group may be split into several slices; a slice may be split into several tiles; a tile may be split into several work units; and so forth. In the context of neural engine 314, a work unit may be a segment of the input data, such as data processed by planar engine 340 or data processed a prior cycle of neural engines 314 having a size that produces output values that fit into accumulator 414 of neural engine 314 during a single cycle of the computation core 416. In one case, the size of each work unit is 256 bytes. In such embodiments, for example, work units can be shaped to one of 16×16, 32×8, 64×4, 128×2 or 256×1 datasets. In the context of planar engine 340, a work unit may be (i) a segment of input data, (ii) data from neural engine 314 or (iii) data from a prior cycle of planar engine 340 that can be processed simultaneously at planar engine 340.

Rasterizer 430 may perform the operations associated with dividing the input data into smaller units (segments) and regulate the processing of the smaller units through the MACs 404 and accumulator 414. Rasterizer 430 keeps track of sizes and ranks of segments of the input/output data (e.g., groups, work units, input channels, output channels) and instructs the components of a neural processor circuit 218 for proper handling of the segments of the input data. For example, rasterizer 430 operates shifters 410 in input buffer circuits 402 to forward correct segments 408 of input data to MAC 404 and send the finished output data 328 to data buffer 334. Other components of neural processor circuit 218 (e.g., kernel DMA 324, data processor DMA 320, data buffer 334, planar engine 340) may also have their corresponding rasterizers to monitor the division of input data and the parallel computation of various segments of input data in different components.

Output circuit 424 receives processed values 417 from post-processor 428 and interfaces with data processor circuit 318 to store processed values 417 in data processor circuit 318. For this purpose, output circuit 424 may send out as output data 328 in a sequence or a format that is different from the sequence or format in which the processed values 417 are processed in post-processor 428.

The components in neural engine 314 may be configured during a configuration period by NE control 418 and neural task manager 310. For this purpose, neural task manager 310 sends configuration information to neural engine 314 during the configuration period. The configurable parameters and modes may include, but are not limited to, mapping between input data elements and kernel elements, the number of input channels, the number of output channels, performing of output strides, and enabling/selection of post-processing operations at post-processor 428.

Example Planar Engine Architecture

Figure 5:
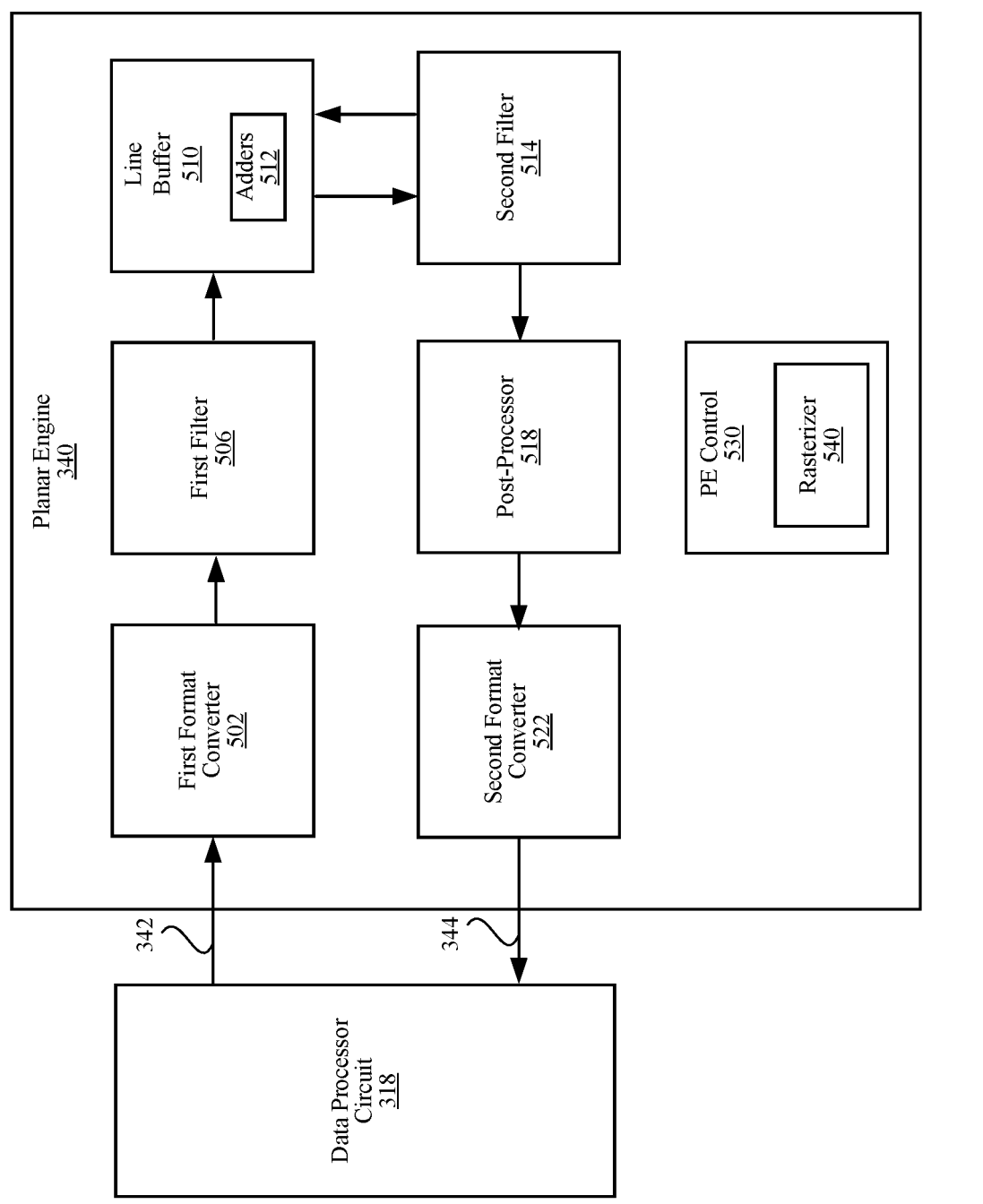
FIG. 5 is a block diagram of a planar engine in the neural processor circuit, according to one embodiment.

FIG. 5 is a block diagram of planar engine 340, according to one embodiment. Planar engine 340 is a circuit that is separated from neural engines 314 and can be programmed to perform in different modes of operations. For example, planar engine 340 may operate in a pooling mode that reduces the spatial size of data, in a reduction mode that reduces the rank of a tensor, in a gain-and-bias mode that provides a single-pass addition of bias and scaling by a scale factor, and in an elementwise mode that includes elementwise operations. For this purpose, planar engine 340 may include, among other components, a first format converter 502, a first filter 506 (also referred to herein as "multi-mode horizontal filter 506"), a line buffer 510, a second filter 514 (also referred to herein as "multi-mode vertical filter 514"), a post-processor 518, a second format converter 522, and a planar engine (PE) control 530 (includes rasterizer 540). Planar engine 340 may include fewer components or further components not illustrated in FIG. 5A. Each component in planar engine 340 may be embodied as a circuit or a circuit in combination with firmware or software.

Input data 342 of planar engine 340 may be fetched from one or more source datasets that are saved in data processor circuit 318. If a dataset to be processed by planar engine 340 is larger than a work unit of data that can be simultaneously processed by planar engine 340, such dataset may be segmented into multiple work units for reading as input data 342 to planar engine 340. Depending on the mode of planar engine 340, input data 342 may include data from one or more source datasets. The source dataset described herein refers to different data saved in neural processor circuit 218 for processing. Different components of neural processor circuit 218 may generate or transmit data that is saved in data processor circuit 318. For example, neural engines 314, planar engine 340 (which generated data in a previous operation cycle), and system memory 230 may generate or transmit different datasets that are saved in different memory locations of data processor circuit 318. Various source datasets may represent different tensors. In an operation cycle of planar engine 340, different source datasets may be fetched together as input data 342. For example, in an elementwise mode that involves the addition of two different tensors to derive a resultant tensor, the input data 342 may include data from two different source datasets, each providing a separate tensor. In other modes, a single source dataset may provide input data 342. For example, in a pooling mode, input data 342 may be fetched from a single source dataset.

First format converter 502 is a circuit that performs one or more format conversions on input data 342 in one format (e.g., a format used for storing in buffer 334) to another format for processing in subsequent components of planar engine 340. Such format conversions may include, among others, the following: applying a ReLU function to one or more values of input data 342, converting one or more values of input data 342 to their absolute values, transposing a tensor included in the sources, applying gain to one or more values of input data 342, biasing one or more values of input data 342, normalizing or de-normalizing one or more values of input data 342, converting floating-point numbers to signed or unsigned numbers (or vice versa), quantizing numbers, and changing the size of a tensor such as by broadcasting a value of a tensor in one or more dimensions to expand the rank of the tensor. The converted input data 342 and unconverted input data 342 to planar engine 340 are collectively referred to herein as "a version of the input data."

First filter 506 is a circuit that performs a filtering operation in one direction. For this purpose, first filter 506 may include, among other components, adders, comparators, and multipliers. The filtering performed by first filter 506 may be, for example, averaging, choosing a maximum value or choosing a minimum value. When averaging, adders are used to sum the values of input data 342 and a weighting factor may be applied to the sum using a multiplier to obtain the average as the resultant values. When selecting maximum and minimum values, the comparators may be used in place of the adders and the multipliers to select the values.

Line buffer 510 is a memory circuit for storing the result such as one or more intermediate data obtained from first filter 506 or second filter 514. Line buffer 510 may store values of different lines and allows access from second filter 514 or other downstream components to fetch the intermediate data for further processing. In some modes, line buffer 510 is bypassed. Line buffer 510 may also include logic circuits to perform additional operations other than merely storing the intermediate data. For example, line buffer 510 includes adder circuits 512, which in combination with memory component, enables line buffer 510 to function as an accumulator that aggregates data generated from the results of first filter 506 or second filter 514 to separately store aggregated data of a dimension not to be reduced.

Similar to first filter 506, second filter 514 performs filtering operations but in a direction different from first filter 506. For this purpose, second filter 514 may include, among other components, adders, comparators, and multipliers. In the pooling mode, first filter 506 performs filtering operation in a first dimension, while second filter 514 performs filtering operation in a second dimension. In other modes, first filter 506 and second filter 514 may operate differently. In a reduction mode, for example, first filter 506 performs elementwise operations while second filter 514 functions as a reduction tree to aggregate values of data.

Post-processor 518 is a circuit that performs further processing of values fetched from other upstream components. Post-processor 518 may include specialized circuits that are efficient at performing certain types of mathematical computations that might be inefficient to perform using a general computation circuit. Operations performed by post-processor 518 may include, among others, performing square root operations and inverse of values in a reduction mode. Post-processor 518 may be bypassed in other operation modes.

Second format converter 522 is a circuit that converts the results of preceding components in planar engine 340 from one format to another format for output data 344. Such format conversions may include, among others, the following: applying a ReLU function to the results, transposing a resultant tensor, normalizing or de-normalizing one or more values of the results, and other number format conversions. Output data 344 may be stored in data processor circuit 318 as the output of neural processor circuit 218 or as inputs to other components of neural processor circuit 218 (e.g., neural engine 314).

PE control 530 is a circuit that controls operations of other components in planar engine 340 based on the operation mode of planar engine 340. Depending on the different modes of operation, PE control 530 programs register associated with the different components in planar engine 340 so that the programmed components operate in a certain manner. The pipeline of components or connections between the components in planar engine 340 may also be reconfigured. In the pooling mode, for example, data processed at by first filter 506 may be stored in line buffer 510 and then be read by second filter 514 for further filtering. In the reduction mode, however, data is processed by first filter 506, then processed at second filter 514 and then accumulated in line buffer 510 that is programmed as an accumulator. In the elementwise mode, line buffer 510 may be bypassed.

PE control 530 also includes a rasterizer 540 that tracks the current task or process loop being processed at planar engine 340. Rasterizer 540 is a circuit that tracks units or segments of input data and/or loops for processing the input data in planar engine 340. Rasterizer 540 may control the fetch of segments to planar engine 340 in each operation cycle and may monitor the size and rank of each segment being processed by planar engine 340. For example, smaller segments of a dataset may be fetched as input data 342 in a raster order for processing at planar engine 340 until all segments of the source dataset are processed. In fetching the segments, rasterizer 540 monitors the coordinate of the segment in the dataset. The manner in which a dataset is segmented into input data 342 for processing at planar engine 340 may be different compared to how a dataset is segmented into input data 328 for processing at neural engines 314.

The dataset for processing at planar engine 340 may be larger than the capacity of planar engine 340 that can be processed in a single operation cycle. In such case, planar engine 340 fetches different segments of the dataset as input data 342 in multiple operating cycles. The fetched segment may partly overlap with a previously fetched segment and/or a next segment to be fetched. In one embodiment, the portion of overlapping data is fetched only once and reused to reduce the time and power consumption cost of planar engine 340 in fetching data.

Example Neural Task Manager and Task List Compilation

Figure 6:
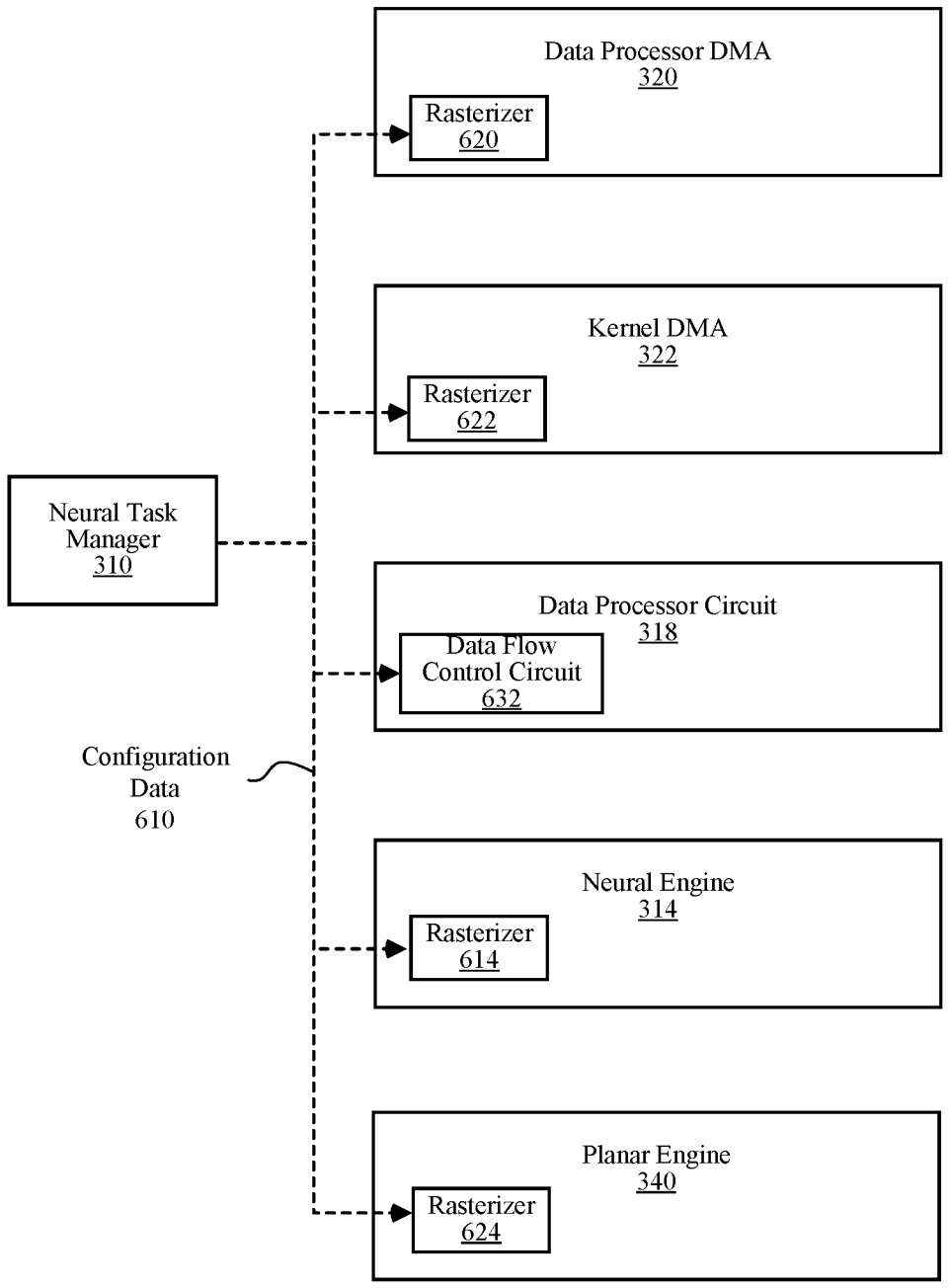
FIG. 6 is a diagram illustrating programming of rasterizers and a data flow control circuit to configure components of the neural processor circuit, according to one embodiment.

FIG. 6 is a diagram illustrating programming of rasterizers 614, 622, 624 and data control circuit 332 in components 314, 318, 322, 340 of the neural processor circuit 218, according to one embodiment. To perform their functions, rasterizers 614, 622, 624 and data control circuit 332 receive configuration data 610 indicating how the input data and/or kernel data are to be segmented and to be handled by each component of the neural processor circuit 218. The task information includes information about particulars of the current layer (e.g., dimensions of input and output data, dimension of an associated kernel, types of padding at the boundaries of input data). Rasterizers 614, 622, 624 and data control circuit 332 may also receive constraints on their operations (e.g., whether to allow or disallow tile width over a threshold). Configuration data 610 sent to data control circuit 332 may further include information about data dependency and data hazards so that the data control circuit 332 may coordinate reading of input data to neural engines 314 and planar engine 340 from the data processor circuit 318 and the writing of output data of neural engines 314 and planar engine 340 to the data processor circuit 318.

By providing rasterizers in different components of neural processor circuit 218, overhead in data transmitted between the components of the neural processor circuit 218 may be reduced. If a single central rasterizer is provided to control different components of the neural processor circuit 218, kernel data, input data, and output data transmitted between the components may be needed in these data to identify associated position in the loops of the task such as convolution group, tile, slice, work unit, input channel and output channel. By using distributed rasterizers, no separate metadata is needed to transmit the kernel data, input data and output data among components of the neural processor circuit 218.

Figure 7:
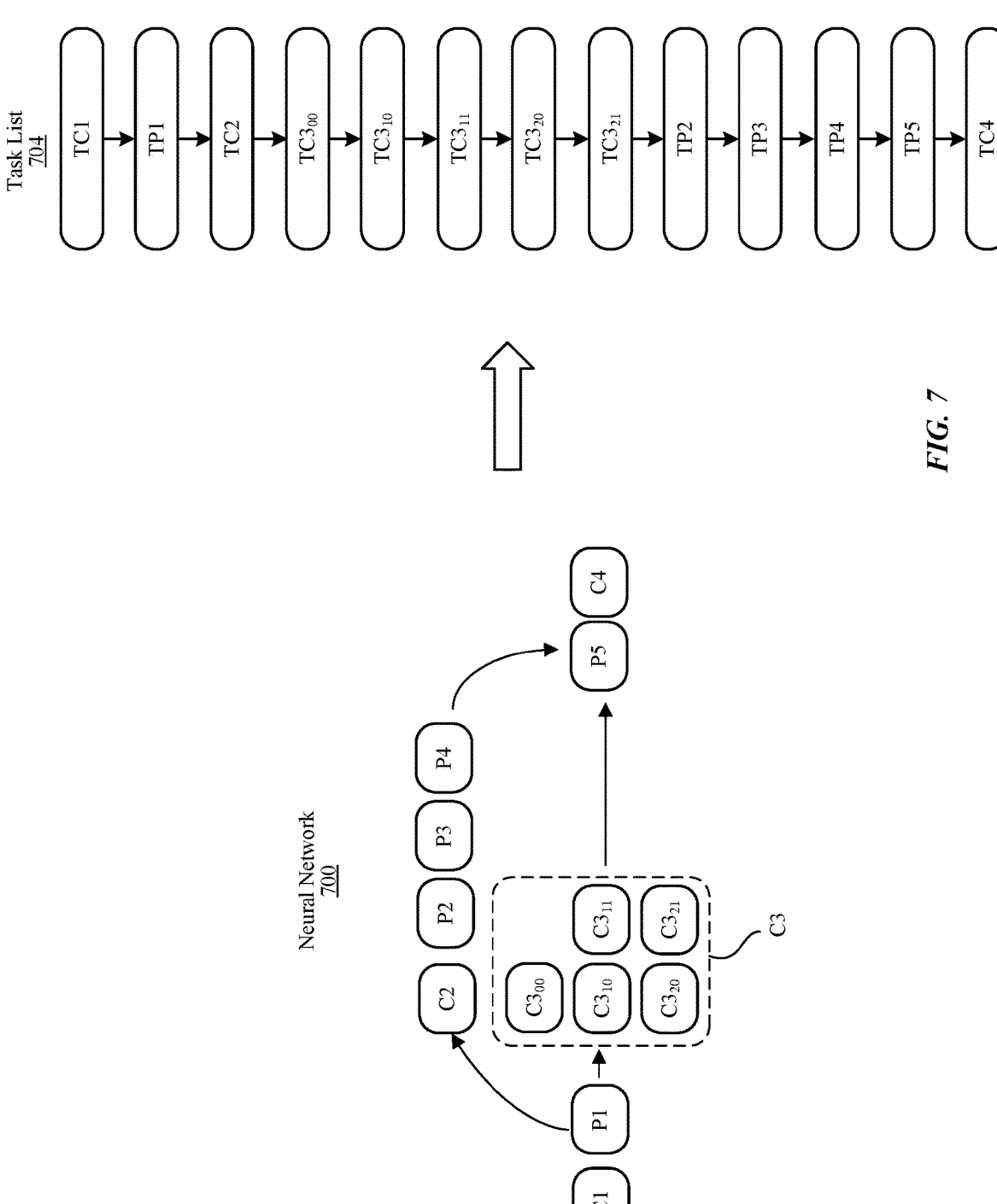
FIG. 7 is a schematic block diagram illustrating a neural network represented by a list of tasks, according to one embodiment.

A neural network may include network layers or sub-layers that are instantiated or implemented as a series of tasks executed by the neural processor circuit 218. FIG. 7 is a schematic block diagram illustrating a neural network 700 represented by a list 704 of tasks, according to one embodiment. The neural network 700 includes network layers (or sub-layers) including convolution layers C1, C2, C3 (including sub-layers $C3_{00}$, $C3_{10}$, $C3_{11}$, $C3_{20}$, and $C3_{21}$), C4, and non-convolution layers (e.g., pooling layers) P1, P2, P3 and P4. The neural network 700 is an example of a neural network architecture that may be instantiated by the neural processor circuit 218. That is, when tasks in the neural network 700 are converted into the task list 704 to become executable by the neural processor circuit 218. Other types of neural network architectures with different types of network layers or orders of network layers may also be instantiated by the neural processor circuit 218.

The neural network 700 is converted into task list 704 through a compiler process executed, for example, by CPU 208. The task list 704 includes a sequence of tasks including neural engine tasks TC1 through TC4 (corresponding to convolution layers C1 through C4) and planar engine tasks TP1 through TP5 (corresponding to pooling layers P1 through P5). Neural engine task TC3 is divided up into smaller neural engine tasks $TC3_{00}$ through $TC3_{21}$ (corresponding to sub-layers $C3_{00}$ through $C3_{21}$). In some embodiments, the task list 704 is saved in a linked list format. Although listed as a linear linked chain of tasks, the neural engine tasks and the planar engine tasks need not be performed in this sequence. Rather, in order to increase the efficiency of neural processor circuit 218, it is desirable to perform planar engine tasks in parallel with neural engine tasks as long as data dependency and data hazards issues are addressed. In one or more embodiments, the sequence of tasks among the neural engine tasks and the sequence of tasks among the planar engine tasks as determined during the compiler process are maintained, but the sequence between a planar engine task and a neural engine task can be switched.

Each task is associated with a task descriptor that defines a configuration of the neural processor circuit 218 to execute the task. Each task may correspond with a single network layer of the neural network 700, a portion of a network layer of the neural network 700, or multiple network layers of the neural network 700. The neural processor circuit 218 instantiates the neural network 700 by executing the tasks of the task list 704 under the control of the neural task manager 310.

Asynchronous Execution of Neural Engine Tasks and Planar Engine Tasks

Figure 8:
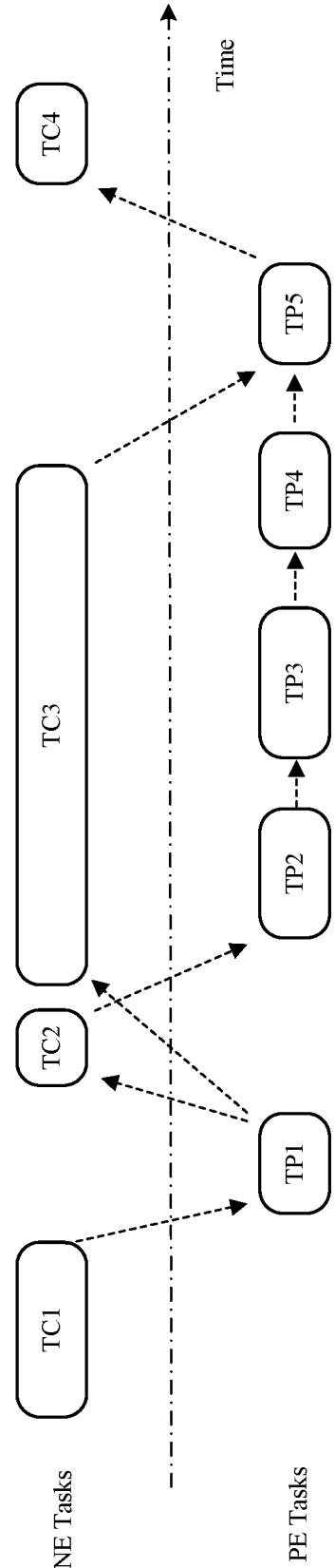
FIG. 8 is a timing diagram illustrating execution of tasks in the neural processor circuit, according to one embodiment.

FIG. 8 is a timing diagram illustrating execution of tasks in neural processor circuit 218, according to one embodiment. In this example, the tasks are started in the sequence of TC1, TP1, TC2, TC3, TP2, TP3, TP4, TP5 and TC4. Such sequence does not coincide with the sequence of tasks in task list 704 of FIG. 7. Because task TC3 is a long neural engine task and planar engine 340 can perform operations in parallel with neural engines 314, planar engine tasks TP2 through TP4 are performed while neural engine task TC3 is being performed. By processing tasks TP2 through TP4 in parallel with task TC3, the data for task TP5 is made available faster than performing the process in the sequence of task list 704.

Although FIG. 8 illustrates adjacent neural engine tasks and adjacent planar engine tasks as being separated by a time difference to facilitate the explanation, in practice, the times at which adjacent neural engine tasks and adjacent planar engine tasks are performed may overlap. Neural engines 314 and planar engine 340 may adopt pipelined processing architecture where they can receive input data for one task while producing output data for a previous task, neural engines 314 and planar engine 340 may operate on data on different tasks at the same time. For example, neural engine 314 may start on task TC3 before task TC2 is finished, and planar engine 340 may start on task TP3 before task TP2 is finished.

Figure 9:
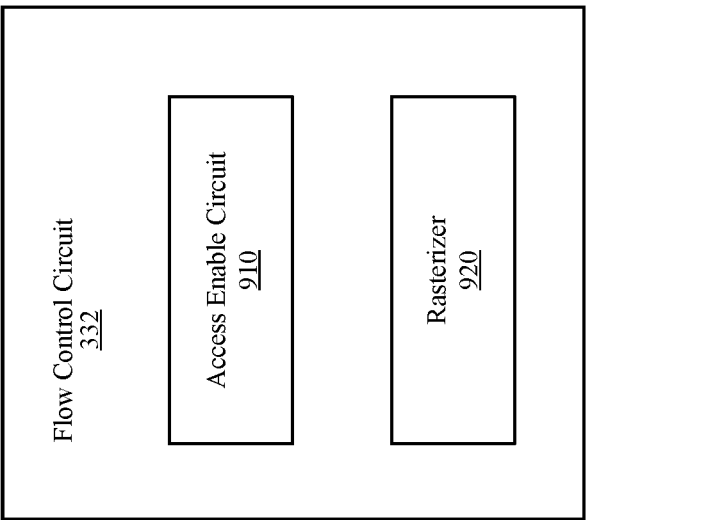
FIG. 9 is a block diagram of a data control circuit in a data processor circuit, according to one embodiment.

To address the data dependency issue, data control circuit 332 controls times at which neural input data and planar input data are sent to neural engines 314 and planar engine 340, respectively. For this purpose, data control circuit 332 may include, among other components, access enable circuit 910, rasterizer 920, as illustrated in FIG. 9. Data control circuit 332 may include other components not illustrated in FIG. 9.

Access enable circuit 910 is a programmable circuit that selectively grants access to read data from or write data to buffer 334 of data processor circuit 318. Neural engines 314 and planar engine 340 may be structured so that their circuits and components do not produce output data until input data is provided. Hence, access enable circuit 910 may cause the neural engines 314 or planar engine 340 to hold off its pending task by preventing neural engines 314 or planar engine 340 from accessing input data in the buffer 334 until all dependent data for the pending task is available in buffer 334. Access enable circuit 910 may determine the data dependency for a task by reading and analyzing dependency information included in a task information entry corresponding to the task, and determine whether all the dependent data is available in buffer 334 by referencing the status of tasks tracked by rasterizer 920. In this way, access enable circuit 910 may prevent starting of a next task dependent on output data of a previous task until the output data of the previous task is stored and available in buffer 334.

Access enable circuit 910 may also prevent writing of output data (generated by neural engines 314 and planar engine 340) to buffer 334 or reading of input data to address data hazards issues. For this purpose, access enable circuit 910 may reference the status of operations as indicated by rasterizer 920. Based on the indicated stats, access enable circuit 910 may prevent neural engines 314 or planar engine 340 from writing output data to buffer 334 until another operation or task is finished or prevent neural engines 314 or planar engine 340 from reading input data from buffer 334 for a current task until at least a portion of output data from a prior task is stored in buffer 334. Access enable circuit 910 may also perform other arbitration between any neural engines 314 and planar engine 340 for the access to the buffer 334.

Rasterizer 920 is a circuit that tracks the current size of data for each task or process loop being processed at data processor circuit 318. The function and operations of rasterizer 920 are substantially the same as rasterizers explained above in detail with reference to FIGS. 4 and 6. In one or more embodiments, at a given time, raster 920 may track a task that is different from tasks that other rasterizers (e.g., rasterizer 620 and rasterizer 622) are tracking.

Example Task Management

Figure 10:
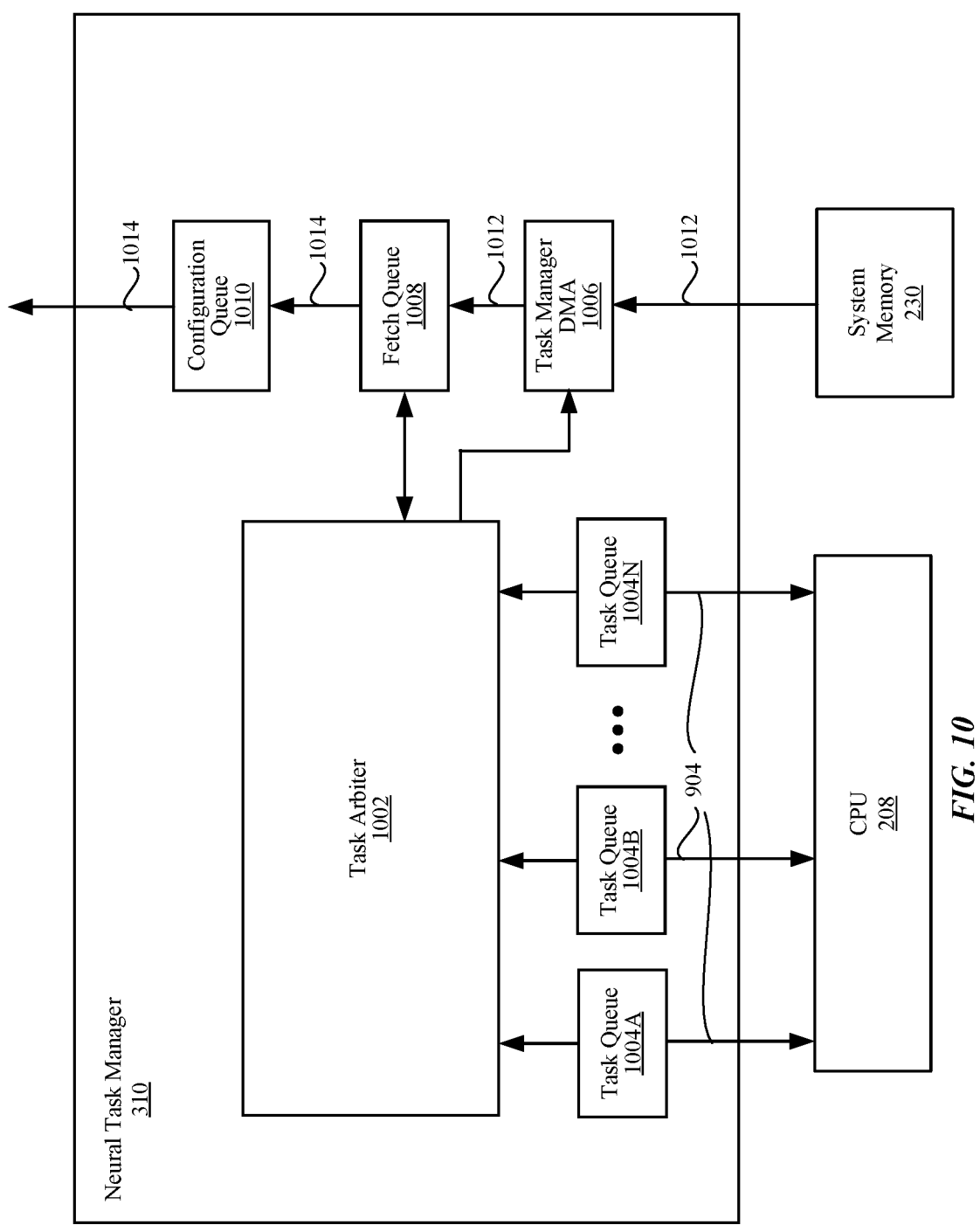
FIG. 10 is a block diagram of a neural task manager in the neural processor circuit, according to one embodiment.

FIG. 10 is a block diagram illustrating neural task manager 310, according to one embodiment. Neural task manager 310 manages the execution of tasks for one or more neural networks 700 by neural processor circuit 218. Neural task manager 310 may include, among other components, task arbiter 1002, task queues 1004A through 1004N (hereinafter collectively referred as "task queues 1004" and individually also referred to as "task queue 1004"), task manager direct memory access (DMA) 1006, fetch queue 1008, and configuration queue 1010. Neural task manager 310 may include other components not illustrated in FIG. 10. For each task, neural task manager 310 may receive a task descriptor 1012 from a software compiling process. The task descriptor may define a configuration of neural processor circuit 218 to execute a corresponding neural engine task or a corresponding planar engine task. Neural task manager 310 transmits a version of the task descriptor 1012 (e.g., the task descriptor 1012 or data configuration 1014 extracted from the task descriptor 1012) to data processor circuit 318.

Task arbiter 1002 is a circuit or a combination of circuit and firmware that selects tasks from task queues 1004 for execution by neural processor circuit 218. Task arbiter 1002 dequeues tasks from task queues 1004, and places tasks in configuration queue 1010. While a task is in a configuration queue, it is committed to execution and the neural processor circuit performs a prefetch for input data and kernel data before the task is executed by other components of neural processor circuit 218. For example, task arbiter 1002 may perform fixed-priority arbitration between multiple task queues 1004, and select the task from the task queues 1004 with the highest priority for retrieval of a task descriptor 1012 from the system memory 230 by task manager DMA 1006.

Neural task manager 310 may include one or more task queues 1004. Each task queue 1004 is coupled to CPU 208 and task arbiter 1002. Each task queue 1004 receives from CPU 208 a reference to task list 704 of tasks that when executed by the neural processor circuit 218 instantiates neural network 700. The reference stored in each task queue 1004 may include a set of pointers and counters pointing to task list 704 of the task descriptors 1012 in system memory 230. Each task queue 1004 may be further associated with a priority parameter that defines the relative priority of task queues 1004. Task descriptor 1012 of a task specifies a configuration of neural processor circuit 218 for executing the task.

Task manager DMA 1006 is coupled to task arbiter 1002, system memory 230, and fetch queue 1008. Task manager DMA 1006 includes a read circuit that receives task descriptors 1012 of tasks from a source (e.g., system memory 230) for storing in fetch queue 1008. For example, task arbiter 1002 selects task queue 1004 according to the priorities of task queues 1004, and uses task list 704 referenced by selected task queue 1004 to control task manager DMA 1006 to select task descriptor 1012 of a task.

Fetch queue 1008 is a single entry queue that stores task descriptor 1012 of a task that is pending to commit for execution. Fetch queue 1008 is coupled to task manager DMA 1006 to receive the task descriptor 1012 from the system memory 230, and provides the task descriptor 1012 to configuration queue 1010, or configuration data 1014 extracted from task descriptor 1012 to configuration queue 1010.

Configuration queue 1010 holds configuration data 1014 of multiple tasks that have been committed for execution. When a task is in configuration queue 1010, kernel DMA 324 may fetch kernel data from system memory 230 to store in kernel extract circuit 432 of neural engines 314, and data processor DMA 320 may fetch input data from system memory 230 to store in data processor circuit 318. To execute the task, kernel extract circuit 432 provides the prefetched kernel data to MAC 404 of neural engine 314, and data buffer 334 provides the prefetched input data to MAC 404 of neural engine 314. Planar engine 340 also accesses data processor circuit 318 to read its input data 342. In some embodiments, configuration queue 1010 may include multiple queues that holds configuration data 1014 extracted from the committed task descriptors 1012. As discussed in greater detail in connection with FIG. 13, configuration queue 1010 is further coupled to other components of neural processor circuit 218 to configure neural processor circuit 218 according to configuration data 1014.

Figure 11:
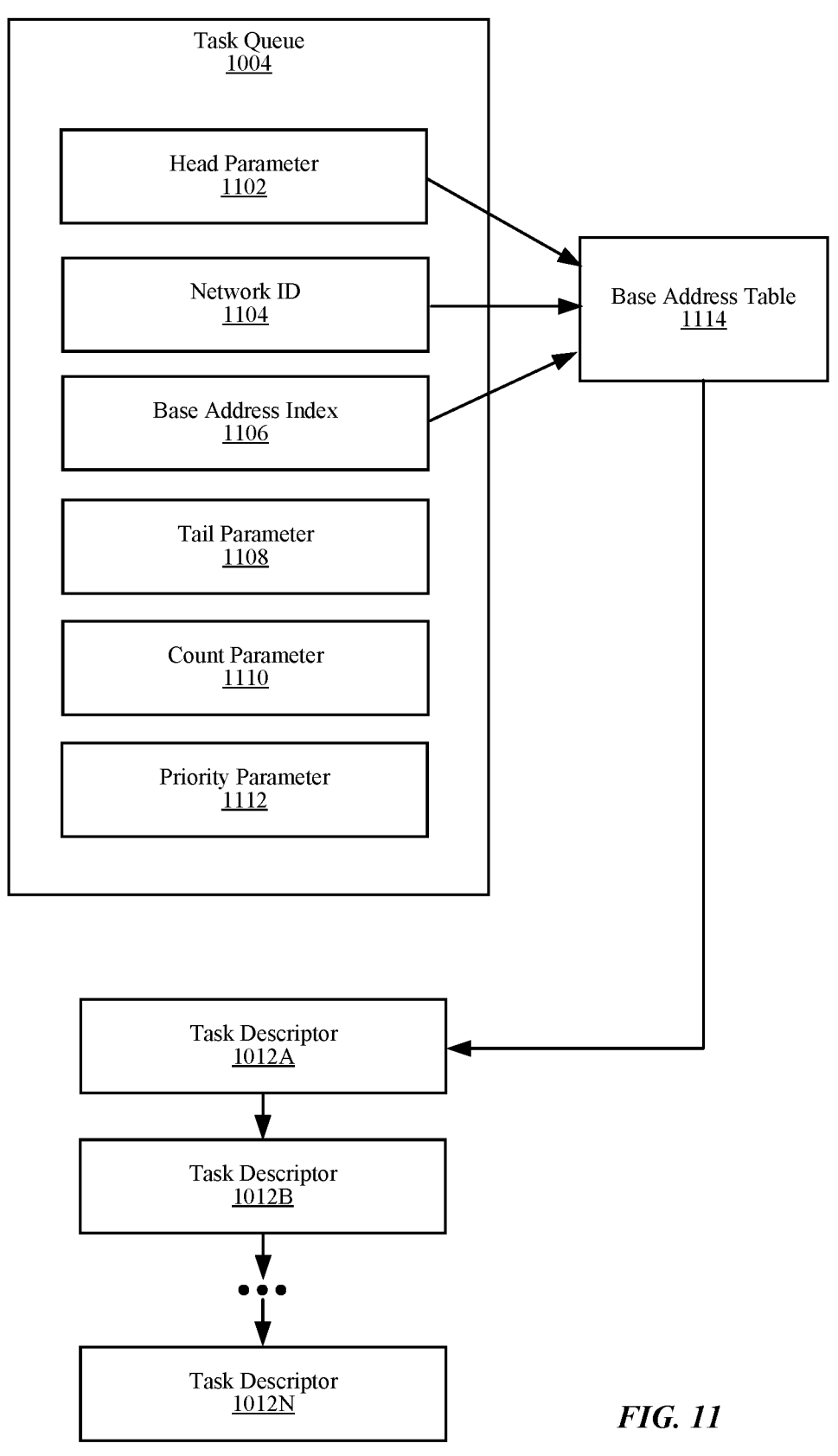
FIG. 11 is a diagram illustrating retrieval of task descriptors using a task queue, according to one embodiment.

FIG. 11 is a diagram illustrating retrieval of task descriptors 1012 using task queue 1004, according to one embodiment. Task queue 1004 includes a reference, such as a set of pointers, to task descriptors 1012A through 1012N stored in the system memory 230. To that end, task queue 1004 may include a memory storing head parameter 1102, network identifier (ID) 1104, base address index 1106, tail parameter 1108, count parameter 1110, and priority parameter 1112. Head parameter 1102 is a pointer to a location of system memory 230 storing task descriptor 1012A at the head of task queue 1004. Network ID 1104 identifies the neural network 700 of task descriptor 1012 at the head of task queue 1004, and base address index 1106 is an index to a base-address table 1114 tagged with network ID 1104 of task descriptor 1012A at the head of task queue 1004. Count parameter 1110 defines the number of task descriptors 1012 in task queue 1004. Priority parameter 1112 defines the priority of task queue 1004, which is used by task arbiter 1002 to select between multiple task queues 1004.

When a particular task queue 1004 is selected (e.g., according to the priority parameter 1112), task arbiter 1002 references head parameter 1102, network ID 1104, base address index 1106, and base address table 1114 to retrieve task descriptor 1012 from system memory 230, and places task descriptor 1012 into fetch queue 1008 to initiate commitment of the task for execution. In each configuration period, task arbiter 1002 may continue to place task descriptor 1012 into fetch queue 1008 according to the order of tasks defined by task list 704 of task queue 1004, such as by retrieving the next task descriptor 1012B, and so forth.

Figure 12:
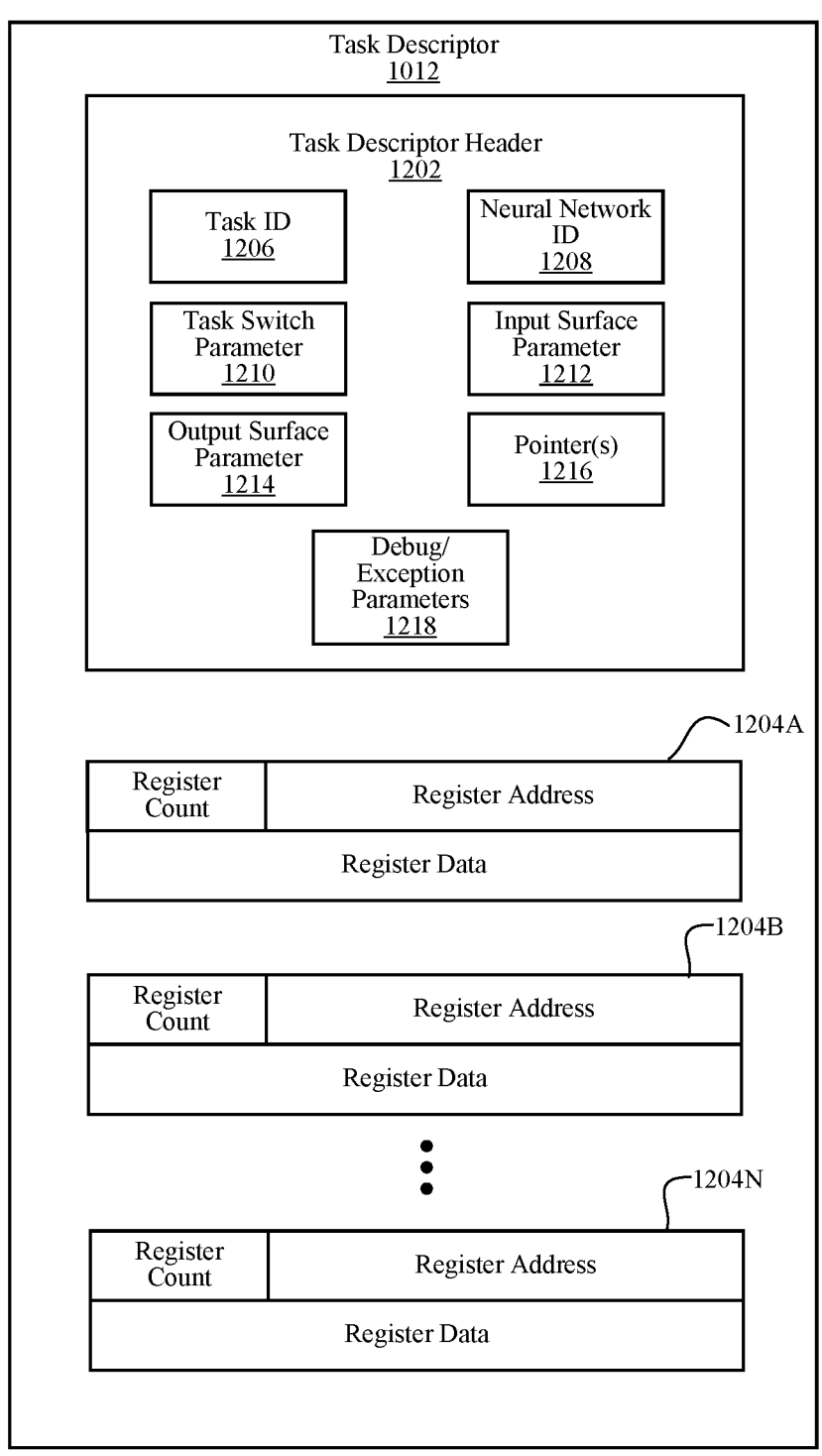
FIG. 12 is a diagram illustrating a task descriptor, according to one embodiment.

FIG. 12 is a diagram illustrating task descriptor 1012, according to one embodiment. Task arbiter 1002 places task descriptor 1012 in fetch queue 1008 from system memory 230, which is then transferred to configuration queue 1010. The highest priority (e.g., first in) task descriptor 1012 in configuration queue 1010 is used to configure neural processor circuit 218 for execution during the configuration period. Task descriptor 1012 includes configuration data 1014 including task descriptor header 1202 and address data 1204A through 1204N (hereinafter referred as "address data 1204"). Task descriptor header 1202 includes configuration data 1014 that configures various operations of neural task manager 310, including operations related to task selection and task switching. For example, task descriptor header 1202 may be parsed by task arbiter 1002 to extract configuration data 1014 that programs neural task manager 310 and other components of the neural processing circuit 218. Task descriptor header 1202 may include task identifier (ID) 1206 that identifies the task, neural network identifier (ID) 1208 that identifies neural network 700 instantiated by the task, task switch parameter 1210 defining whether the neural task manager 310 should initiate a task switch (e.g., to execute a task of a different task queue 1004) after execution of the task, input surface parameter 1212 defining whether the input data for the task should be retrieved from system memory 230 or data processor circuit 318, output surface parameter 1214 defining whether the output data of the task should be stored in system memory 230 or data processor circuit 318, various (e.g., base address) pointers 1216 to facilitate the programming of neural processor circuit 218, and one or more debug/exception parameters 1218 that control event, exception, or debug logging.

Each instance of address data 1204A through 1204N (collectively or individually referred to as "address data 1204") defines an address and data payload pair used to program the components of the neural processor circuit 218. The data payload may include input data and kernel data used to execute the task. For example, each instance of address data 1204 includes register data defining the data payload, a register address defining a destination memory location of neural processing circuit 218 for receiving the register data, and a register count defining a number of consecutive memory locations (e.g., registers) to be written with the register data. In some embodiments, the register address is combined with the base address stored in header 1202 to define the full address of each memory location. If task descriptor 1116 is generated at compile time, then the actual run time addresses may not be known. Base address table 1114 is used avoid duplicating or updating all task descriptors with dynamically assigned addresses.

In one or more embodiments, address data 1204A is used for programming data processor circuit 318. Address data 1204A includes data dependency information. Data dependency information is included as part of configuration data 1014C sent to data processor circuit 318.

Example Task Management in Data Processor Circuit

Figure 13:
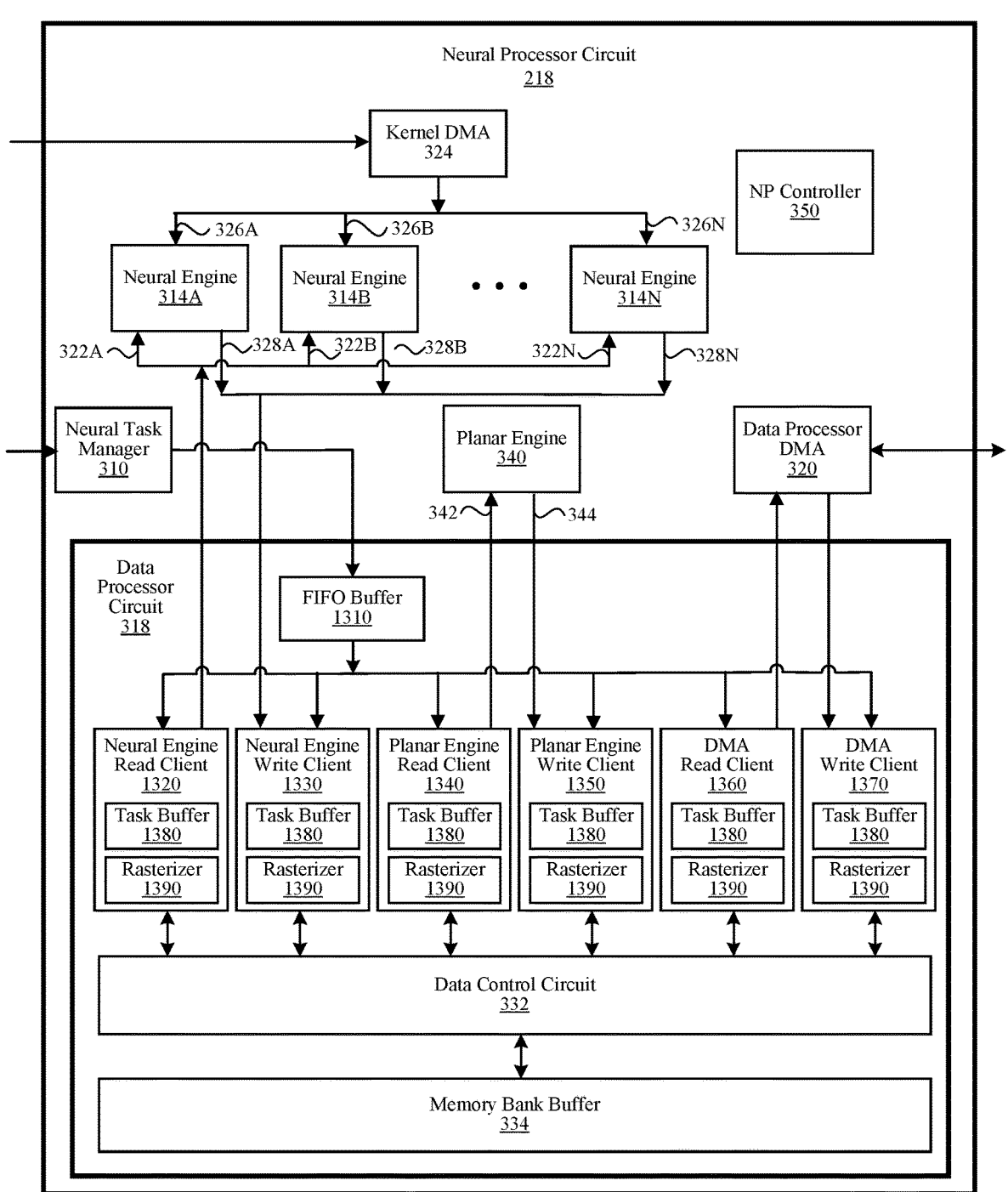
FIG. 13 is a block diagram illustrating an example configuration of a neural processor circuit, according to one embodiment.

FIG. 13 is a block diagram illustrating an example configuration of neural processor circuit 218, according to an embodiment. The configuration shown in FIG. 13 is one of the example configurations corresponding to neural processor circuit 218 shown in FIG. 3. Some of the components' locations in FIG. 3 (e.g., data processor DMA 320, NP controller 350) are moved in FIG. 13. FIG. 13 includes a more detailed structure of data processor circuit 318. Unless otherwise specified, the configuration and function of each component shown in FIG. 13 may correspond to the descriptions associated with previous figures. For instance, details of the data processor DMA 320, Kernel DMA 324, and NP controller 350 are discussed in FIG. 3, details of the neural engines 314 are discussed in FIG. 4, details of the data control circuit 332 are discussed in FIG. 9, details of the neural task manager 310 are discussed in FIG. 10, etc. To distinguish the various buffer circuits shown in data processor circuit 318 in FIG. 13, buffer 334 shown in FIG. 3 is referred to as the memory bank buffer 334.

Data processor circuit 318 includes a first-in-first-out (FIFO) buffer 1310 and various clients for controlling the operations of neural engines 314, planar engine 340, and data processor DMA 320. The clients may include a neural engine read client 1320, a neural engine write client 1330, a planar engine read client 1340, a planar engine write client 1350, a DMA read client 1360, and a DMA write client 1370. While six example clients are shown in FIG. 13, data processor circuit 318 may include fewer or additional clients. For an operating component (e.g., neural engine 314, planar engine 340, and data processor DMA 320) that is in communication with data processor circuit 318, data processor circuit 318 may include one or more clients for controlling the activities of the operating component.

A client (1320, 1330, 1340, 1350, 1360, and 1370) is a circuit or a combination of circuit and firmware that controls the tasks to be performed by an operating component. A read client (e.g., 1320, 1340, and 1360) controls the transmission of data to an operating component. For example, in one embodiment, neural engine 314 does not begin a computation task until the neural engine read client 1320 sends a command to the data control circuit 332 to fetch neural input data 322 directly from memory bank buffer 334 or through neural engine read client 1320. A write client (e.g., 1330, 1350, 1370) allows data outputted by an operating component to be written to a memory destination, such as memory bank buffer 334 or system memory 230 (shown in FIG. 3 but not in FIG. 13). For example, for outputs of an inner convolutional layer of a CNN, neural engine write client 1330 controls the writing of the neural output data 328 to memory bank buffer 334. In another example, for output data of the last layer of a neural network, DMA write client 1370 sends a command to data processor DMA 320 to write the data to system memory 230. In the particular example embodiment shown in FIG. 13, neural processor circuit 218 includes a pair of clients (one for reading and another for writing) for each operating component. In other embodiments, a single client may be responsible for both reading and writing actions for an operating component.

The circuit of each client may include or may be coupled to a task buffer circuit 1380 and a rasterizer circuit 1390. The configuration and functions of each task buffer circuit 1380 and each rasterizer circuit 1390 associated with a different client may be substantially the same. For simplicity, various task buffer circuits 1380 and rasterizer circuits 1390 are commonly referred to as a task buffer 1380 and a rasterizer 1390 without a different numerical reference number for different task buffers or rasterizers that are associated with different clients. One or more task buffers 1380 may be used for storing a first queue of the neural engine tasks for one or more neural engines 314 to perform. One or more other task buffers 1380 may be used for storing a second queue of the planar engine tasks for one or more planar engines 340 to perform.

A task buffer 1380 includes a buffer circuit for storing tasks in a task queue. A task queue may be stored in the task buffer 1380 as a linked list or another suitable format. In various embodiments, a task buffer 1380 may directly store task descriptors of the tasks as a task queue or store identifiers of the tasks as a task queue while the task descriptors are stored in memory bank buffer 334. Task buffer 1380 may have a limited memory space to limit the maximum number of tasks in a task queue that can be stored in task buffer 1380. The maximum number of tasks for each task buffer 1380 for different clients 1320, 1330, etc., may be the same. The maximum number of tasks for each task buffer 1380 may be a predetermined number (e.g., limited by the capacity of the task buffer 1380). For example, in one embodiment, the maximum number of tasks for each task buffer 1380 is 12. However, in some embodiment, the predetermined number may be programmable. Task buffer 1380 stores uncompleted tasks as a task queue, usually in a FIFO manner. When a task gets to the front of the line of the task queue, the task descriptor associated with the task is fetched by the rasterizer 1390 for analyzing the breakdown of the task.

FIFO buffer 1310 distributes tasks to each task buffer 1380. The FIFO buffer 1310 receives tasks from neural task manager 310, whose operations are described in FIG. 10. The task descriptor received by FIFO buffer 1310 may be a version of task descriptor 1012 (e.g., task descriptor 1012 or configuration data 1014 derived from task descriptor 1012). FIFO buffer 1310 may receive various types of tasks for different operating components of neural processor circuit 218. For examples, the tasks may include neural engine tasks, planar engine tasks, and tasks related to data processor DMA 320. In some embodiments, FIFO buffer 1310 may distribute the tasks based on their type to the corresponding clients (e.g., neural engine tasks to be sent to neural engine read client 1320 or neural engine write client 1330). Yet, in other embodiments, for reasons of task skew management that will be discussed in further detail with reference to FIG. 14, FIFO buffer 1310 duplicates the task and distributes the same task to more than one task buffers 1380 in different clients regardless of the type of the task. For example, in one embodiment, FIFO buffer 1310 distributes the same task to neural engine read client 1320, neural engine write client 1330, planar engine read client 1340, and planar engine write client 1350. In another embodiment, FIFO buffer 1310 distributes the same task to every client in the data processor circuit 318.

FIFO buffer 1310 may examine the task queue in each task buffer 1380 to determine whether to send another task. For an incoming task (incoming from neural task manager 310) that is about to be sent from FIFO buffer 1310, if the task queue in a destination task buffer 1380 reaches a threshold (e.g., the task queue is full), FIFO buffer 1310 stops sending the incoming task to the destination task buffer 1380. In the case of task skew management where the same task is distributed to multiple destination task buffers 1380, if any one of the task queues in one or more task buffers 1380 reaches the threshold, the FIFO buffer 1310 stops sending the task to any of the destination task buffers 1380. The FIFO buffer 1310 stores the task in a FIFO task queue. In one embodiment, if there is a task that is stopped from being sent to a client due to the task buffer 1380 associated with the client being full, any subsequent tasks arriving FIFO buffer 1310, regardless of the types of the tasks, may reside in the FIFO queue of the FIFO buffer 1310 due to the FIFO property.

A task reaching a task buffer 1380 is added to the task queue thereof. The task waits in the queue until the task reaches the front of the queue. In some embodiments, only tasks relevant to the client are added to task buffer 1380 associated with the client. In other embodiments, based on a task skew management scheme that will be discussed in FIG. 14, a task buffer 1380 may receive an irrelevant task that is not intended for the client. For example, the task buffer 1380 associated with neural engine read client 1320 may receive a planar engine task. In the case where an irrelevant task reaches the front of the queue in a task buffer 1380, the client may disregard the irrelevant task and move on to the next task until a relevant task reaches the front of the queue. For example, a task buffer 1380 of a client may include a filter that removes tasks that are not intended for the component associated with the client. Each task descriptor may include a metadata field that identifies the type of task (e.g., intended for neural engine 314, intended for planar engine 340, etc.). The filter may remove irrelevant tasks based on the metadata.

When a previous task is completed and a relevant task reaches the front of a queue, rasterizer 1390 fetches the task descriptor of the task and analyzes the data configuration (e.g., the size of data described in the task) associated with the task. Rasterizer 1390 determines how data is broken down into work units and how the task is completed in multiple cycles. Rasterizer 1390 also monitors the position of each work unit and keeps track of the progress and locations of work units. Based on the analysis of the rasterizer 1390, the client generates a series of commands for an operating component (e.g., a neural engine 314) to perform computations of various work units. The commands are transmitted to data control circuit 332 to allow the component to read or write data from buffer 334. For example, in each cycle, a neural engine 314 reads data corresponding to a work unit from buffer 334 for convolution operations. Rasterizer 1390 continues to monitor the progress of work units until the computation of the last work unit associated with a task is completed. In such a case, the task is completed and the client proceeds to the next relevant task.

Example Task Skew Management Scheme

Referring to FIG. 7, neural processor circuit 218 may perform the tasks specified in the task list 704 in an asynchronous manner. Neural engines 314, planar engine 340, and data processor DMA 320 may operate in parallel for different tasks. For example, in task list 704, neural engines 314 may perform the TC1 task (first convolution task) while planar engine 340 may perform the TP1 task (first planar task) at the same time. Various types of tasks have different degrees of complexity. For example, a convolution task (an example of neural engine tasks) could be significantly more complex than an elementwise task (an example of planar engine tasks). A planar engine 340 may continue to perform the TP2 task after the TP1 task is completed. In some cases, because of a large difference in the degree of complexity, one type of operating components (e.g., planar engine 340) may be significantly ahead of another type of operating components (e.g., neural engine 314). This could create a large task skew between different types of tasks. For example, a skew of 4 is present if neural processor circuit 218 is processing TC1 and TP5 at the same time. A large task skew is undesirable because some tasks are dependent on the results of other types of tasks. The data dependency could become highly complex if the task skew is high. Also, the size of memory bank buffer 334 will need to increase if a large task skew is present because more data will need to be stored for a longer time due to the interdependency of data in various tasks.

Figure 14:
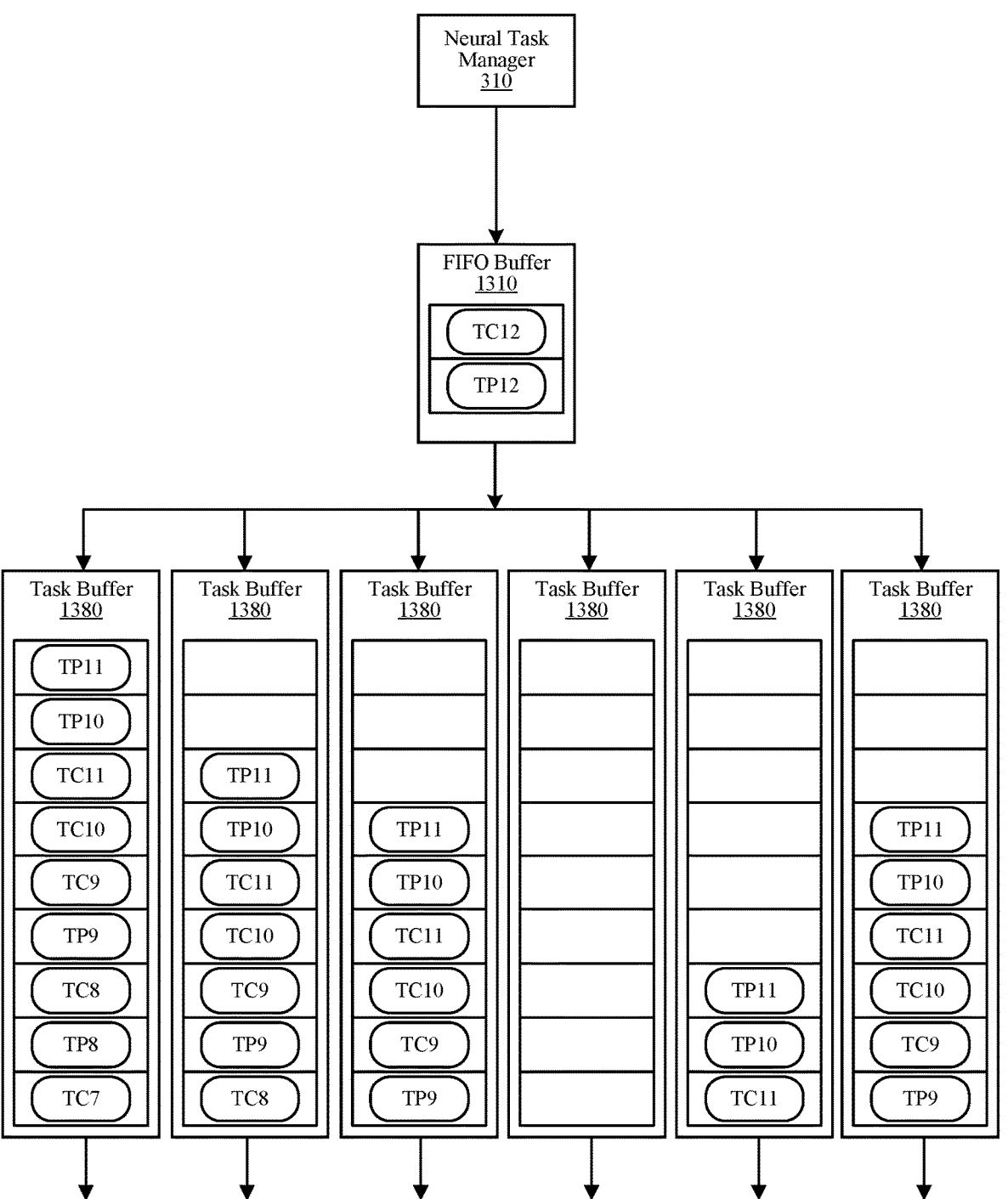
FIG. 14 is a conceptual diagram illustrating a task skew management scheme, according to one embodiment.

FIG. 14 is a conceptual diagram illustrating a task skew management scheme, according to an embodiment. Each task buffer 1380 corresponds to a different client (1320, 1330, etc.) of neural processor circuit 218. Each task buffer

1380 has limited space for a maximum number of tasks to be stored in a task queue. The maximum number of tasks in a queue may also be referred to as a threshold. In the example shown in FIG. 14, the threshold is set to 9. In other embodiments, the threshold can be another suitable number, such as 12. In some embodiments, the threshold may be programmable. Also, while each task buffer 1380 has the same threshold, in some embodiments the thresholds for various clients may be different.

Each task buffer 1380 receives tasks from FIFO buffer 1310. FIFO buffer 1310 receives tasks from neural task manager 310 and sends tasks in a FIFO manner to various task buffer 1380. In one embodiment, the task will be duplicated and distributed to multiple task buffers 1380. In the particular example shown in FIG. 14, a task sent from FIFO buffer 1310 is distributed to every task buffer 1380. As such, the task TP11 is at the end of the task queue in every task buffer 1380. In other embodiments, a subset of task buffers 1380 receives the task. In each task buffer 1380, the received tasks form a task queue, which is represented in FIG. 14 from the top (the end of the queue) to the bottom (the front of the queue). When a task gets to the bottom (the front of the queue), the client associated with the task buffer 1380 may filter the irrelevant task and move to the next task in line until a relevant task is at the front of the queue. The relevant task is removed from the queue after the task is completed.

Each task in a task queue may take a different amount of time to complete at various clients. For example, a relevant task for one client may be immediately filtered as irrelevant for another client. Also, tasks have different degrees of complexity and datasets associated with the tasks also have different size. Hence, the task queues in the six task buffers 1380 show different lengths because each client clears up the queue at a different pace. For example, the task TC7 may be only relevant to the client associated with the leftmost task buffer 1380. The task TC7 may also be a highly complex task. As a result, the client associated with the leftmost task buffer 1380 could take a long time to complete TC7 compared to the time to complete other tasks. In the example shown in FIG. 14, the leftmost task buffer 1380 has accumulated a number of tasks that reaches the threshold of the task buffer 1380. Put differently, the task queue is full.

The task skew management scheme may create a head-of-line (HOL) blocking to limit the task skew between different types of tasks. Data processor circuit 318 stops addition of an incoming task to any of the queues in response to one or more of the queues stored in task buffers 1380 reaching the threshold. Incoming tasks are received from neural task manage 310 at FIFO buffer 1310 of data processor circuit 318. Data processor circuit 318 detects whether one or more of the queues stored in task buffers 1380 reach the threshold. If none of the task buffers 1380 reaches the threshold and still has space to accept at least one more task, FIFO buffer 1310 distributes the task to the plurality of task buffers 1380 and the task will join the last of the queues. If one or more task buffers 1380 reach the threshold, the FIFO buffer 1310 holding an incoming task at the FIFO buffer circuit. For example, in FIG. 14, the leftmost task buffer 1380 reaches the threshold. FIFO buffer 1310 stops sending the task TP12 to any of task buffers 1380 until the leftmost task buffer 1380 clears the task TC7. Other upcoming tasks (e.g., TC12) are also in the FIFO buffer 1310. In response to FIFO buffer 1310 being full, neural processor circuit 218 stops fetching tasks from neural task manager 310.

The threshold of task buffers 1380 sets a maximum task skew among different operational components in neural processor circuit 218, such as between neural engine tasks and planar engine tasks. For example, if a client for neural engines 314 takes a long time to complete a complex neural engine task, the task queue for the client will become full. As a result, FIFO buffer 1310 stops addition of tasks to any of the task buffers 1380. In some embodiments, even though another client has completed all of its tasks, the client's task buffer 1380 will not receive an additional task until the complex neural engine task is fully completed. For example, in FIG. 14, the fourth task buffer 1380 that has an empty task queue may be responsible for planar tasks. FIFO buffer 1310 stops sending planar task TP12 to any task buffer 1380 until the client corresponding to the leftmost task buffer 1380 completes the task TC7. The task skew between neural engine tasks TC and planar engine tasks TP is limited based on this management scheme.

Example Process for Task Skew Management

FIG. 15 is a flowchart depicting an example process for performing neural processing operations with task skew management, according to an embodiment. The process may be performed by a neural processor circuit 218. Neural processor circuit 218 stores 1510 a plurality of queues of tasks in a plurality of buffer circuits that include a first buffer circuit and a second buffer circuit. The first buffer circuit and the second buffer circuit may be two of the task buffers 1380. The first buffer circuit and the second buffer circuit may receive the same incoming task each time but may have a different remaining queue because the client associated with the first buffer circuit and the second buffer circuit may process different tasks and perform operations at different paces.

The storing 1510 of the plurality of queues may include storing 1520 a first queue of neural engine tasks for one or more neural engine circuits 314 to perform. For example, a first client associated with the first buffer circuit may control certain operations of neural engines 314. The first queue is associated with the first client. The first queue may include other tasks that are not neural engine tasks but those irrelevant tasks will be filtered. The storing 1510 of the plurality of queues may also including storing 1530 a second queue of neural engine tasks for one or more planar engine circuits 340 to perform. For example, a second client associated with the second buffer circuit may control certain operations of planar engines 340. The second queue is associated with the second client. The second queue may include other tasks that are not planar engine tasks but those irrelevant tasks will be filtered.

Neural processor circuit 218 performs 1540, by one or more neural engines 314, convolution operations on neural input data corresponding to the neural engine tasks to generate neural output data. For example, the first client reads the neural engine task in the front of the first queue and sends commands to one or more neural engines 314 to perform neural engine operations that include convolution operations. The convolution operations may correspond to operation specified in one or more convolutional layers in a CNN.

Neural processor circuit 218 performs 1550, by one or more planar engines 340, non-convolution operations on planar input data corresponding to the planar engine tasks to generate planar output data. Examples of non-convolution operations include elementwise operations, reduction, and other operations discussed in association with FIG. 5. The second client reads the neural engine task in the front of the second queue and sends commands to one or more planar engines 340 to perform planar engine operations. The non-convolution operations may correspond to operation specified in one or more pooling layers or fully connected layers in a CNN.

Neural processor circuit 218 stops 1560 addition of an incoming task to the plurality of queues in response to one or more of the queues stored in the plurality of buffer circuits reaching a threshold. For example, the neural processor circuit 218 may implement a HOL blocking task skew management to detect whether one of the queues are full. The neural processor circuit 218 passes any tasks to the plurality of buffer circuits through a FIFO buffer circuit 1310. In response to detecting any of the queue having a number of tasks reaching the threshold, FIFO buffer circuit 1310 holds the incoming task until the queues stored in plurality of buffer circuits no longer reach the threshold.

While particular embodiments and applications have been illustrated and described, it is to be understood that the invention is not limited to the precise construction and components disclosed herein and that various modifications, changes and variations which will be apparent to those skilled in the art may be made in the arrangement, operation and details of the method and apparatus disclosed herein without departing from the spirit and scope of the present disclosure.

What is claimed is:

1. A neural processor circuit comprising:
one or more neural engine circuits configured to perform convolution operations on neural input data corresponding to one or more neural engine tasks to generate neural output data;
one or more planar engine circuits configured to perform non-convolution operations on planar input data corresponding to one or more planar engine tasks to generate planar output data;
a data processor circuit comprising:
a first buffer circuit configured to store a first queue associated with one of the one or more neural engine circuits; and
a second buffer circuit configured to store a second queue associated with one of the one or more planar engine circuits to perform; and
a first-in-first-out (FIFO) buffer circuit configured to:
duplicate and distribute a neural engine task configured for execution by the one of the one or more neural engine circuits and not configured for execution by the one or more planar engine circuits to the first queue and the second queue such that the same neural engine task is stored in each of the first queue and the second queue,
wherein the one of the one or more neural engine circuits is configured to execute the neural engine task when the neural engine task reaches the front of the first queue,
wherein the second buffer circuit is configured to:
determine that the neural engine task is not intended for the one or more planar engine circuits based on a task descriptor associated with the neural engine task; and
remove the neural engine task when the neural engine task reaches the front of the second queue based on a determination that the neural engine task is not intended for the one or more planar engine circuits,
wherein the one or more planar engine circuits are configured to not execute the neural engine task, and wherein the FIFO buffer circuit is further configured to stop distribution of additional tasks to each of the first queue and the second queue in response to a number of tasks in one of the first queue or the second queue reaching a threshold.

2. The neural processor circuit of claim 1, wherein the FIFO buffer circuit is further configured to hold the additional tasks in response to the number of tasks in the one of the first queue or the second queue reaching the threshold.

3. The neural processor circuit of claim 1, wherein the second buffer circuit comprises a filter circuit that removes the neural engine task when the neural engine task reaches the front of the second queue.

4. The neural processor circuit of claim 1, wherein the data processor circuit further comprises a data control circuit configured to address data dependency between the one or more neural engine tasks and the one or more planar engine tasks.

5. The neural processor circuit of claim 1, wherein at least one of the first queue or the second queue is stored as a linked list.

6. The neural processor circuit of claim 1, further comprising a task manager circuit coupled to the data processor circuit, the task manager circuit configured to:

receive the task descriptor from a software compiling process, the task descriptor defining a configuration of the neural processor circuit to execute a corresponding neural engine task or a corresponding planar engine task, and send a version of the task descriptor to the data processor circuit as the first task.

7. The neural processor circuit of claim 1, wherein the data processor circuit further comprises a memory bank buffer coupled to the one or more neural engine circuits and the one or more planar engine circuits, the memory bank buffer configured to store the neural output data and the planar output data.

8. The neural processor circuit of claim 1, wherein the threshold sets a maximum number of the tasks for the one of the plurality of queues.

9. The neural processor circuit of claim 1, wherein the threshold is the same for the first queue and the second queue.

10. The neural processor circuit of claim 1, wherein the threshold is different for each of the first queue and the second queue.

11. The neural processor circuit of claim 1, wherein the FIFO buffer circuit is further configured to:

determine that the number of tasks in the one of the first queue or the second queue is less than the threshold; and duplicate and distribute the additional tasks to each of the first queue and the second queue based on a determination that the number of tasks in the one of the first queue or the second queue is less than the threshold.

12. The neural processor circuit of claim 11, wherein completion of another task in the one of the first queue or the second queue causes the number of tasks in the one of the first queue or the second queue to be less than the threshold.

13. A method for performing neural processing operations, comprising:

storing a plurality of queues of tasks in a plurality of buffer circuits comprising a first buffer and a second buffer, storing the plurality of queues comprising:

storing a first queue of neural engine tasks for one or more neural engine circuits to perform, and storing a second queue of planar engine tasks for one or more planar engine circuits to perform;

performing, by the one or more neural engine circuits, convolution operations on neural input data corresponding to the neural engine tasks to generate neural output data;

performing, by the one or more planar engine circuits, non-convolution operations on planar input data corresponding to the planar engine tasks to generate planar output data;

duplicating and distributing a neural engine task configured for execution by one of the one or more neural engine circuits and not configured for execution by the one or more planar engine circuits to at least the first queue of the neural engine tasks and the second queue of the planar engine tasks such that the same neural engine task is stored in each of the first queue and the second queue;

executing, by the one of the one or more neural engine circuits, the neural engine task when the neural engine task reaches the front of the first queue;

determining that the neural engine task is not intended for the one or more planar engine circuits based on a task descriptor associated with the neural engine task;

bypassing, by the one or more planar engine circuits, execution of the neural engine task;

removing the neural engine task when the neural engine task reaches the front of the second queue based on determining that the neural engine task is not intended for the one or more planar engine circuits; and stopping distribution of additional tasks to each of the plurality of queues in response to a number of tasks in one of the plurality of queues reaching a threshold, wherein the threshold sets a maximum task skew among the one or more neural engine circuits and the one or more planar engine circuits.

14. The method of claim 13, wherein stopping distribution of the additional tasks to any of the plurality of queues comprises:

holding the additional tasks at the FIFO buffer circuit until the number of tasks in the one of the plurality of queues stored in the plurality of buffer circuits no longer reach the threshold.

15. The method of claim 13, wherein at least one of the plurality of queues corresponds to the tasks for a set of circuits, the set of circuits comprising the neural engine circuits, the planar engine circuits, or another set of circuits, wherein the method further comprises:

filtering tasks that are not intended for the set of circuits from the at least one of the plurality of queues.

16. The method of claim 13, wherein at least one of the plurality of queues is stored in one of the buffer circuits as a linked list.

17. The method of claim 13, further comprising:

receiving the task descriptor from a software compiling process, the task descriptor defining a configuration of the neural processor circuit to execute a corresponding neural engine task or a corresponding planar engine task, a version of the task descriptor corresponding to the first task.

18. The method of claim 13, wherein the threshold sets a maximum number of the tasks for the one of the plurality of queues.

19. An electronic device, comprising:

a memory storing a machine learning model; and a neural processor, comprising:

one or more neural engine circuits configured to perform convolution operations on neural input data corresponding to one or more neural engine tasks to generate neural output data;

one or more planar engine circuits configured to perform non-convolution operations on planar input data corresponding to one or more planar engine tasks to generate planar output data;

a data processor circuit comprising:

a first buffer circuit configured to store a first queue associated with one of the one or more neural engine circuits; and a second buffer circuit configured to store a second queue associated with one of the one or more planar engine circuits to perform; and a first-in-first-out (FIFO) buffer circuit configured to:

duplicate and distribute a neural engine task configured for execution by the one of the one or more neural engine circuits and not configured for execution by the one or more planar engine circuits the first queue and the second queue such that the same neural engine task is stored in each of the first queue and the second queue, wherein the one of the one or more neural engine circuits is configured to execute the neural engine task when the neural engine task reaches the front of the first queue, wherein the second buffer circuit is configured to:

determine that the neural engine task is not intended for the one or more planar engine circuits based on a task descriptor associated with the neural engine task; and remove the neural engine task when the neural engine task reaches the front of the second queue based on a determination that the neural engine task is not intended for the one or more planar engine circuits, wherein the one or more planar engine circuits are configured to not execute the neural engine task, and wherein the FIFO buffer circuit is further configured to stop distribution of additional tasks compiled from the machine learning model to each of the first queue and the second queue in response to a number of tasks in one of the first queue or the second queue reaching a threshold.

20. The electronic device of claim 19, wherein the FIFO buffer circuit is further configured to hold the additional tasks in response to the number of tasks in the one of the first queue or the second queue reaching the threshold.

21. The electronic device of claim 19, wherein the second buffer circuit comprises a filter circuit that removes the neural engine task when the neural engine task reaches the front of the second queue.

* * * * *